US009735523B2

(12) United States Patent
Taylor et al.

(10) Patent No.: US 9,735,523 B2
(45) Date of Patent: Aug. 15, 2017

(54) OPTICAL ASSEMBLIES WITH MANAGED CONNECTIVITY

(71) Applicants: CommScope Connectivity UK Limited, Swindon, Wilshire (GB); CommScope Technologies LLC, Hickory, NC (US)

(72) Inventors: Christopher Taylor, Cheltenham Glos (GB); Cyle D. Petersen, Belle Plaine, MN (US)

(73) Assignees: CommScope Connectivity UK Limited (GB); CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/193,560

(22) Filed: Jun. 27, 2016

(65) Prior Publication Data
US 2016/0380398 A1 Dec. 29, 2016

Related U.S. Application Data

(63) Continuation of application No. 14/169,882, filed on Jan. 31, 2014, now Pat. No. 9,379,501.
(Continued)

(51) Int. Cl.
H01R 24/64 (2011.01)
G02B 6/38 (2006.01)
(Continued)

(52) U.S. Cl.
CPC ........... *H01R 24/76* (2013.01); *G02B 6/3825* (2013.01); *G02B 6/3895* (2013.01); *G02B 6/428* (2013.01);
(Continued)

(58) Field of Classification Search
None
See application file for complete search history.

(56) References Cited

U.S. PATENT DOCUMENTS 3,243,761 A 3/1966 Piorunneck
RE26,692 E 10/1969 Ruehlemann
(Continued)

FOREIGN PATENT DOCUMENTS

CA 2499803 4/2004
DE 102 44 304 3/2004
(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
(Continued)

*Primary Examiner* — Hemang Sanghavi
(74) *Attorney, Agent, or Firm* — Merchant & Gould P.C.

(57) ABSTRACT

An example universal contact assembly includes plug contact members and a sensing contact member that are over-molded together to form a single unit. Example adapter block assembly include a first optical adapter; a first contact assembly disposed in an aperture defined in the first optical adapter; a first circuit board; and a retainer arrangement that holds the first circuit board to the first optical adapter with sufficient force to retain the first contact assembly within the aperture. Example retainer arrangements include a cover having flanges with tabs that deflect into cavities defined by the first optical adapter; clamp members that clamp a cover to the first optical adapter to hold the first circuit board therebetween; and a retention strip having barbs that attach
(Continued)

to the first optical adapter and barbs that attach to the first printed circuit board.

5 Claims, 24 Drawing Sheets

Related U.S. Application Data

(60) Provisional application No. 61/843,752, filed on Jul. 8, 2013, provisional application No. 61/761,042, filed on Feb. 5, 2013.

(51) Int. Cl.
*H01R 24/76* (2011.01)
*H01R 13/703* (2006.01)
*H04Q 1/02* (2006.01)
*G02B 6/42* (2006.01)
*H01R 107/00* (2006.01)

(52) U.S. Cl.
CPC ....... *G02B 6/4292* (2013.01); *H01R 13/7033* (2013.01); *H01R 24/64* (2013.01); *H04Q 1/13* (2013.01); *G02B 6/3817* (2013.01); *G02B 6/3897* (2013.01); *H01R 2107/00* (2013.01)

(56) References Cited

U.S. PATENT DOCUMENTS

| | | |
|---|---|---|
| 3,954,320 A | 5/1976 | Hardesty |
| 4,127,317 A | 11/1978 | Tyree |
| 4,737,120 A | 4/1988 | Grabbe et al. |
| 4,953,194 A | 8/1990 | Hansen et al. |
| 4,968,929 A | 11/1990 | Hauck et al. |
| 5,041,005 A | 8/1991 | McHugh |
| 5,052,940 A | 10/1991 | Bengal |
| 5,064,381 A | 11/1991 | Lin |
| 5,107,532 A | 4/1992 | Hansen et al. |
| 5,161,988 A | 11/1992 | Krupka |
| 5,166,970 A | 11/1992 | Ward |
| 5,199,895 A | 4/1993 | Chang |
| 5,222,164 A | 6/1993 | Bass, Sr. et al. |
| 5,265,187 A | 11/1993 | Morin et al. |
| 5,305,405 A | 4/1994 | Emmons et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs et al. |
| 5,470,251 A | 11/1995 | Sano |
| 5,473,715 A | 12/1995 | Schofield et al. |
| 5,483,467 A | 1/1996 | Krupka et al. |
| 5,579,425 A | 11/1996 | Lampert et al. |
| 5,674,085 A | 10/1997 | Davis et al. |
| 5,685,741 A | 11/1997 | Dewey et al. |
| 5,697,817 A | 12/1997 | Bouchan et al. |
| 5,712,942 A | 1/1998 | Jennings et al. |
| 5,800,192 A | 9/1998 | David et al. |
| 5,821,510 A | 10/1998 | Cohen et al. |
| 5,854,824 A | 12/1998 | Bengal et al. |
| 5,871,368 A | 2/1999 | Erdner et al. |
| 5,910,776 A | 6/1999 | Black |
| 6,002,331 A | 12/1999 | Laor |
| 6,095,837 A | 8/2000 | David et al. |
| 6,095,851 A | 8/2000 | Laity et al. |
| 6,116,961 A | 9/2000 | Henneberger et al. |
| 6,222,908 B1 | 4/2001 | Bartolutti et al. |
| 6,222,975 B1 | 4/2001 | Gilbert et al. |
| 6,227,911 B1 | 5/2001 | Boutros et al. |
| 6,234,830 B1 | 5/2001 | Ensz et al. |
| 6,238,235 B1 | 5/2001 | Shavit et al. |
| 6,280,231 B1 | 8/2001 | Nicholls |
| 6,285,293 B1 | 9/2001 | German et al. |
| 6,300,877 B1 | 10/2001 | Schannach et al. |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,364,694 B1 | 4/2002 | Lien |
| 6,409,392 B1 | 6/2002 | Lampert et al. |
| 6,409,548 B1 | 6/2002 | Guttierez |
| 6,421,322 B1 | 7/2002 | Koziy et al. |
| 6,422,895 B1 | 7/2002 | Lien |
| 6,424,710 B1 | 7/2002 | Bartolutti et al. |
| 6,437,894 B1 | 8/2002 | Gilbert et al. |
| 6,456,768 B1 | 9/2002 | Boncek et al. |
| D466,479 S | 12/2002 | Pein et al. |
| 6,499,861 B1 | 12/2002 | German et al. |
| 6,511,231 B2 | 1/2003 | Lampert et al. |
| 6,522,737 B1 | 2/2003 | Bartolutti et al. |
| 6,554,484 B2 | 4/2003 | Lampert |
| 6,574,586 B1 | 6/2003 | David et al. |
| 6,588,938 B1 * | 7/2003 | Lampert ............. G02B 6/3817 385/58 |
| 6,612,856 B1 | 9/2003 | McCormack |
| 6,626,697 B1 | 9/2003 | Martin et al. |
| 6,636,152 B2 | 10/2003 | Schannach et al. |
| 6,684,179 B1 | 1/2004 | David |
| 6,719,588 B1 | 4/2004 | Zheng et al. |
| 6,725,177 B2 | 4/2004 | David et al. |
| 6,743,044 B2 | 6/2004 | Musolf et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,811,446 B1 | 11/2004 | Chang |
| 6,814,624 B2 | 11/2004 | Clark et al. |
| 6,850,685 B2 | 2/2005 | Tinucci et al. |
| 6,898,368 B2 | 5/2005 | Colombo et al. |
| 6,905,363 B2 | 6/2005 | Musolf et al. |
| 6,926,558 B2 | 8/2005 | Sasai et al. |
| 6,932,517 B2 | 8/2005 | Swayze et al. |
| D510,068 S | 9/2005 | Haggay et al. |
| 6,939,168 B2 | 9/2005 | Oleynick et al. |
| 6,961,675 B2 | 11/2005 | David |
| 6,971,895 B2 | 12/2005 | Sago et al. |
| 6,976,867 B2 | 12/2005 | Navarro et al. |
| 7,077,710 B2 | 7/2006 | Haggay et al. |
| 7,081,808 B2 | 7/2006 | Colombo et al. |
| 7,088,880 B1 | 8/2006 | Gershman |
| 7,112,090 B2 | 9/2006 | Caveney et al. |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,207,819 B2 | 4/2007 | Chen |
| 7,210,858 B2 | 5/2007 | Sago et al |
| 7,226,217 B1 | 6/2007 | Benton et al. |
| 7,234,944 B2 | 6/2007 | Nordin et al. |
| 7,241,157 B2 | 7/2007 | Zhuang et al. |
| 7,297,018 B2 | 11/2007 | Caveney et al. |
| 7,300,214 B2 | 11/2007 | Doo et al. |
| 7,312,715 B2 | 12/2007 | Shalts et al. |
| D559,186 S | 1/2008 | Kelmer |
| 7,315,224 B2 | 1/2008 | Gurovich et al. |
| 7,352,289 B1 | 4/2008 | Harris |
| 7,356,208 B2 | 4/2008 | Becker |
| 7,370,106 B2 | 5/2008 | Caveney |
| 7,384,300 B1 | 6/2008 | Salgado et al. |
| 7,396,245 B2 | 7/2008 | Huang et al. |
| 7,458,517 B2 | 12/2008 | Durrant et al. |
| 7,479,032 B2 | 1/2009 | Hoath et al. |
| 7,490,996 B2 | 2/2009 | Sommer |
| 7,497,709 B1 | 3/2009 | Zhang |
| 7,519,000 B2 | 4/2009 | Caveney et al. |
| 7,534,137 B2 | 5/2009 | Caveney et al. |
| 7,552,872 B2 | 6/2009 | Tokita et al. |
| 7,563,116 B2 | 7/2009 | Wang |
| 7,570,861 B2 | 8/2009 | Smrha et al. |
| 7,575,454 B1 | 8/2009 | Aoki et al. |
| 7,588,470 B2 | 9/2009 | Li et al. |
| 7,591,667 B2 | 9/2009 | Gatnau Navarro et al. |

(56) References Cited

U.S. PATENT DOCUMENTS

| | | |
|---|---|---|
| 7,601,034 B1 | 10/2009 | Aekins et al. |
| 7,607,926 B2 | 10/2009 | Wang |
| 7,635,280 B1 | 12/2009 | Crumlin et al. |
| 7,648,377 B2 | 1/2010 | Naito et al. |
| 7,682,174 B2 | 3/2010 | Chen |
| 7,686,650 B2 | 3/2010 | Belopolsky et al. |
| 7,722,370 B2 | 5/2010 | Chin |
| 7,727,026 B2 | 6/2010 | Qin et al. |
| 7,785,154 B2 | 8/2010 | Peng |
| 7,794,287 B1 | 9/2010 | Harlan et al. |
| 7,798,832 B2 | 9/2010 | Qin et al. |
| 7,811,119 B2 | 10/2010 | Caveney et al. |
| 7,814,240 B2 | 10/2010 | Salgado et al. |
| 7,867,017 B1 | 1/2011 | Chen |
| 7,869,426 B2 | 1/2011 | Hough et al. |
| 7,872,738 B2 | 1/2011 | Abbott |
| 7,880,475 B2 | 2/2011 | Crumlin et al. |
| 7,985,100 B2 | 7/2011 | Jaouen et al. |
| 7,993,160 B1 | 8/2011 | Sun et al. |
| 8,157,582 B2 | 4/2012 | Frey et al. |
| 8,282,425 B2 | 10/2012 | Bopp et al. |
| 8,287,316 B2 | 10/2012 | Pepe et al. |
| 8,425,255 B2 | 4/2013 | Erickson et al. |
| 8,512,082 B1 | 8/2013 | Ku et al. |
| 8,596,882 B2 | 12/2013 | Smrha et al. |
| 8,690,593 B2 | 4/2014 | Anderson et al. |
| 8,715,012 B2 | 5/2014 | Taylor |
| 9,128,262 B2 | 9/2015 | Campbell et al. |
| 9,285,552 B2 | 3/2016 | Marcouiller et al. |
| 9,379,501 B2 | 6/2016 | Taylor et al. |
| 9,389,384 B2 | 7/2016 | Solheid et al. |
| 2002/0008613 A1 | 1/2002 | Nathan et al. |
| 2002/0081076 A1 | 6/2002 | Lampert et al. |
| 2003/0031423 A1 | 2/2003 | Zimmel |
| 2003/0147597 A1 | 8/2003 | Duran |
| 2004/0052471 A1 | 3/2004 | Colombo et al. |
| 2004/0052498 A1 | 3/2004 | Colombo et al. |
| 2004/0117515 A1 | 6/2004 | Sago et al. |
| 2004/0240807 A1 | 12/2004 | Frohlich et al. |
| 2005/0167806 A1 | 8/2005 | Mullen et al. |
| 2005/0249477 A1 | 11/2005 | Parrish |
| 2006/0160395 A1 | 7/2006 | Macauley et al. |
| 2006/0193591 A1 | 8/2006 | Rapp et al. |
| 2006/0228086 A1 | 10/2006 | Holmberg et al. |
| 2007/0116411 A1 | 5/2007 | Benton et al. |
| 2007/0237470 A1 | 10/2007 | Aronson et al. |
| 2007/0254529 A1 | 11/2007 | Pepe et al. |
| 2008/0090450 A1 | 4/2008 | Harano et al. |
| 2008/0090454 A1 | 4/2008 | Hoath et al. |
| 2008/0100456 A1 | 5/2008 | Downie et al. |
| 2008/0100467 A1 | 5/2008 | Downie et al. |
| 2008/0175532 A1 | 7/2008 | Ruckstuhl et al. |
| 2008/0175550 A1 | 7/2008 | Coburn et al. |
| 2009/0034911 A1 | 2/2009 | Murano |
| 2009/0097846 A1 | 4/2009 | Kozischek et al. |
| 2009/0166404 A1 | 7/2009 | German et al. |
| 2009/0215310 A1 | 8/2009 | Hoath et al. |
| 2009/0232455 A1 | 9/2009 | Nhep |
| 2010/0048064 A1 | 2/2010 | Peng |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0303421 A1 | 12/2010 | He et al. |
| 2011/0043371 A1 | 2/2011 | German et al. |
| 2011/0115494 A1 | 5/2011 | Taylor et al. |
| 2011/0222819 A1 | 9/2011 | Anderson et al. |
| 2011/0235979 A1 | 9/2011 | Anderson et al. |
| 2011/0255829 A1 | 10/2011 | Anderson et al. |
| 2011/0262077 A1 | 10/2011 | Anderson et al. |
| 2011/0268396 A1 | 11/2011 | He et al. |
| 2012/0003877 A1 | 1/2012 | Bareel et al. |
| 2012/0021636 A1 | 1/2012 | Debendictis et al. |
| 2012/0208401 A1 | 8/2012 | Petersen |
| 2012/0322310 A1 | 12/2012 | Taylor |
| 2014/0011382 A1 | 1/2014 | Taylor et al. |
| 2014/0219615 A1 | 8/2014 | Petersen et al. |
| 2014/0286610 A1 | 9/2014 | Anderson et al. |
| 2016/0004017 A1* | 1/2016 | Zhao ............... G02B 6/3817 385/76 |
| 2016/0285215 A1* | 9/2016 | Little ............... G02B 6/3817 |

FOREIGN PATENT DOCUMENTS

| | | |
|---|---|---|
| DE | 10 2004 033 940 A1 | 2/2006 |
| EP | 1 199 586 A2 | 4/2002 |
| EP | 1 237 024 A1 | 9/2002 |
| EP | 1 467 232 A1 | 10/2004 |
| EP | 1 662 287 A1 | 5/2006 |
| JP | 2007-232960 | 9/2007 |
| WO | WO 00/65696 | 11/2000 |
| WO | WO 02/47215 A1 | 6/2002 |
| WO | WO 2007/061490 A2 | 5/2007 |
| WO | WO 2010/001400 A1 | 1/2010 |
| WO | WO 2010/081186 A1 | 7/2010 |
| WO | WO 2010/121639 A1 | 10/2010 |
| WO | WO 2014/009344 A1 | 1/2014 |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

FOCIS 10—Fiber Optic Connector Intermateability Standard—Type LC, TIA/EIA-604-10A, 38 pages (Mar. 2002).

*Intelligent patching systems carving out a 'large' niche*, Cabling Installation & Maintenance, vol. 12, Issue 7, Jul. 2004 (5 pages).

*IntelliMAC: The intelligent way to make Moves, Adds or Changes!* NORDX/CDT ©2003 (6 pages).

International Search Report and Written Opinion for PCT/US2014/014859 mailed May 21, 2014.

iTRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

TrueNet; TFP Series Rack Mount Fiber Panels, Spec Sheet; May 2008; 8 pages.

* cited by examiner

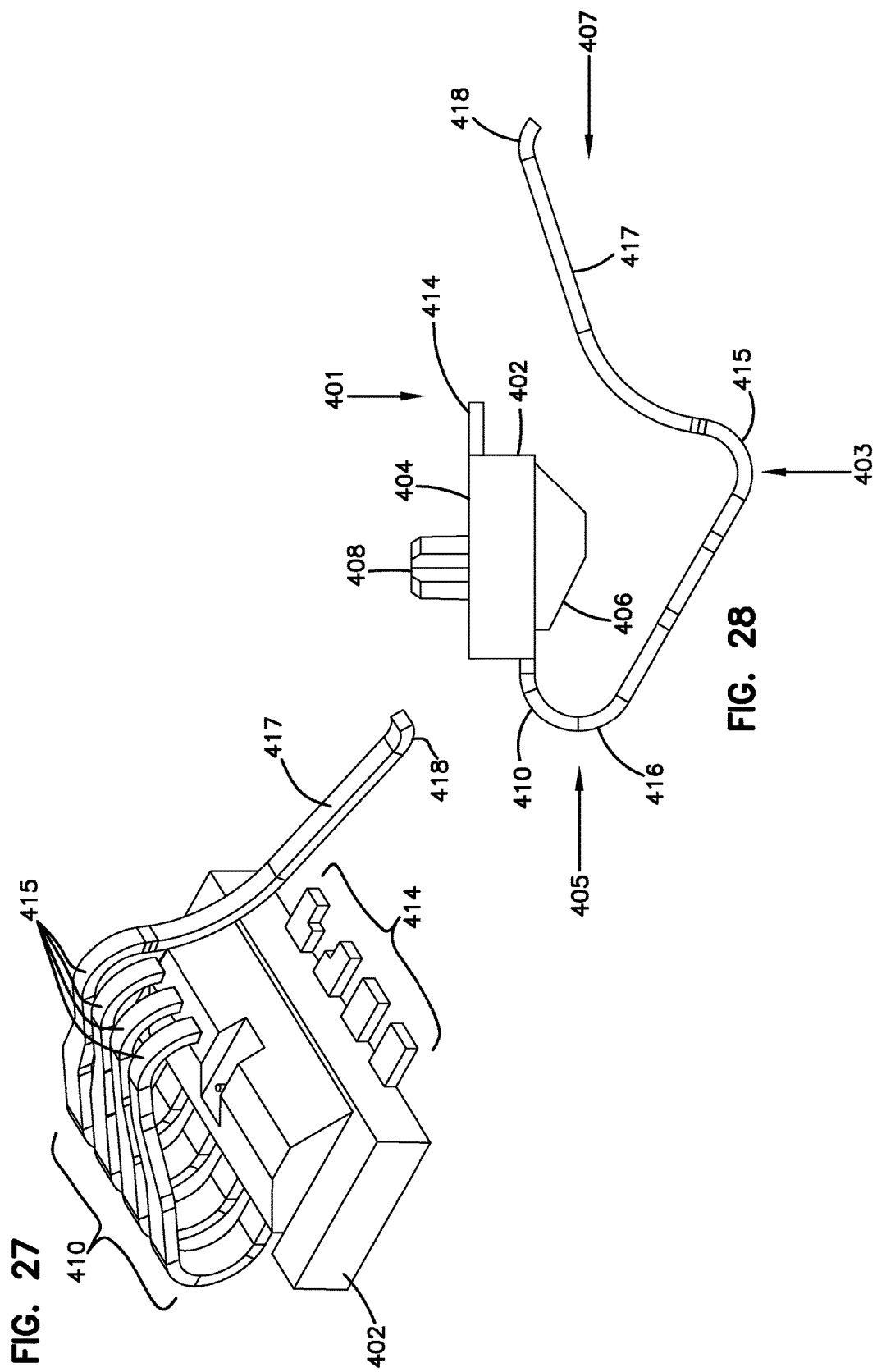

OPTICAL ASSEMBLIES WITH MANAGED CONNECTIVITY

CROSS-REFERENCE TO RELATED APPLICATIONS

This application is a continuation of application U.S. application Ser. No. 14/169,882, filed Jan. 31, 2014, now U.S. Pat. No. 9,379,501, which application claims the benefit of U.S. Provisional Application No. 61/843,752, filed Jul. 8, 2013, and titled "Optical Assemblies with Managed Connectivity;" and of U.S. Provisional Application No. 61/761,042, filed Feb. 5, 2013, and titled "Optical Assemblies with Managed Connectivity;" the disclosures are hereby incorporated herein by reference.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure is generally directed to a universal contact assembly that is useable with a variety of adapter assemblies. For example, in some implementations, the universal contact assembly is useable with LC-type optical adapters and MPO-type optical adapters.

In accordance with some aspects of the disclosure, a contact assembly includes of plug contact members; and a sensing contact member that are overmolded together to form a single unit. The plug contact members are laterally spaced from each other and that have a first contact section and a second contact section.

In accordance with other aspects of the disclosure, a contact assembly includes plug contact members; a sensing contact member; and a body that retains the plug contact members and the sensing contact member. Each plug contact member has a first contact section and a second contact section. At least a first of the plug contact members also has a third contact section. The sensing contact member has a first portion laterally aligned with the first contact sections of the plug contact members. The sensing contact member also has a second portion aligned with the third contact section of the first plug contact member along a non-lateral direction. The is sized and configured so that the first contact sections of the plug contact members extend from a first end of the body, remainders of the plug contact members extend from a second end of the body, and the sensing contact member extends from the first end of the body.

The present disclosure also is generally directed to adapter assemblies having physical layer management capabilities.

In accordance with some aspects of the disclosure, an adapter block assembly includes a first optical adapter; a first contact assembly disposed in an aperture defined in the first optical adapter; at least a first circuit board disposed adjacent one side of the first optical adapter; and a retainer arrangement that holds the first circuit board to the first optical adapter with sufficient force to retain the first contact assembly within the aperture. A total height of the adapter block assembly is no more than 13 mm.

In accordance with other aspects of the disclosure, an adapter block assembly includes a first optical adapter; a first contact assembly disposed in an aperture defined in the first optical adapter; at least a first circuit board disposed adjacent one side of the first optical adapter; and a cover configured to extend over the first circuit board and to couple to the first optical adapter. The cover includes flanges that extend towards the first optical adapter. Each flange includes a tab configured to be deflected laterally into a cavity defined by the first optical adapter.

In accordance with other aspects of the disclosure, an adapter block assembly includes a first optical adapter; a first contact assembly disposed in an aperture defined in the first optical adapter; at least a first circuit board disposed adjacent one side of the first optical adapter; a cover that is configured to extend over the first circuit board and to couple to the first optical adapter; and a plurality of individual clamp members that extend between the cover and the first optical adapter to clamp the first circuit board therebetween.

In accordance with other aspects of the disclosure, an adapter block assembly includes a first optical adapter; a first contact assembly disposed in an aperture defined in the first optical adapter; at least a first circuit board disposed adjacent one side of the first optical adapter; and a retention strip having an adapter retention barb configured to attach to the first optical adapter and a board retention barb configured to attach to the first printed circuit board to holds the first printed circuit board to the first optical adapter with sufficient force to retain the first contact assembly within the aperture.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 27 is another perspective view of the contact assembly of FIG. 26;

FIG. 28 is a side view of the contact assembly of FIG. 26; and

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, media segments connect equipment of the communications network. Non-limiting examples of media segments include optical cables, electrical cables, and hybrid cables. This disclosure will focus on optical media segments. The media segments may be terminated with optical plug connectors, media converters, or other optical termination components.

Figure 24:
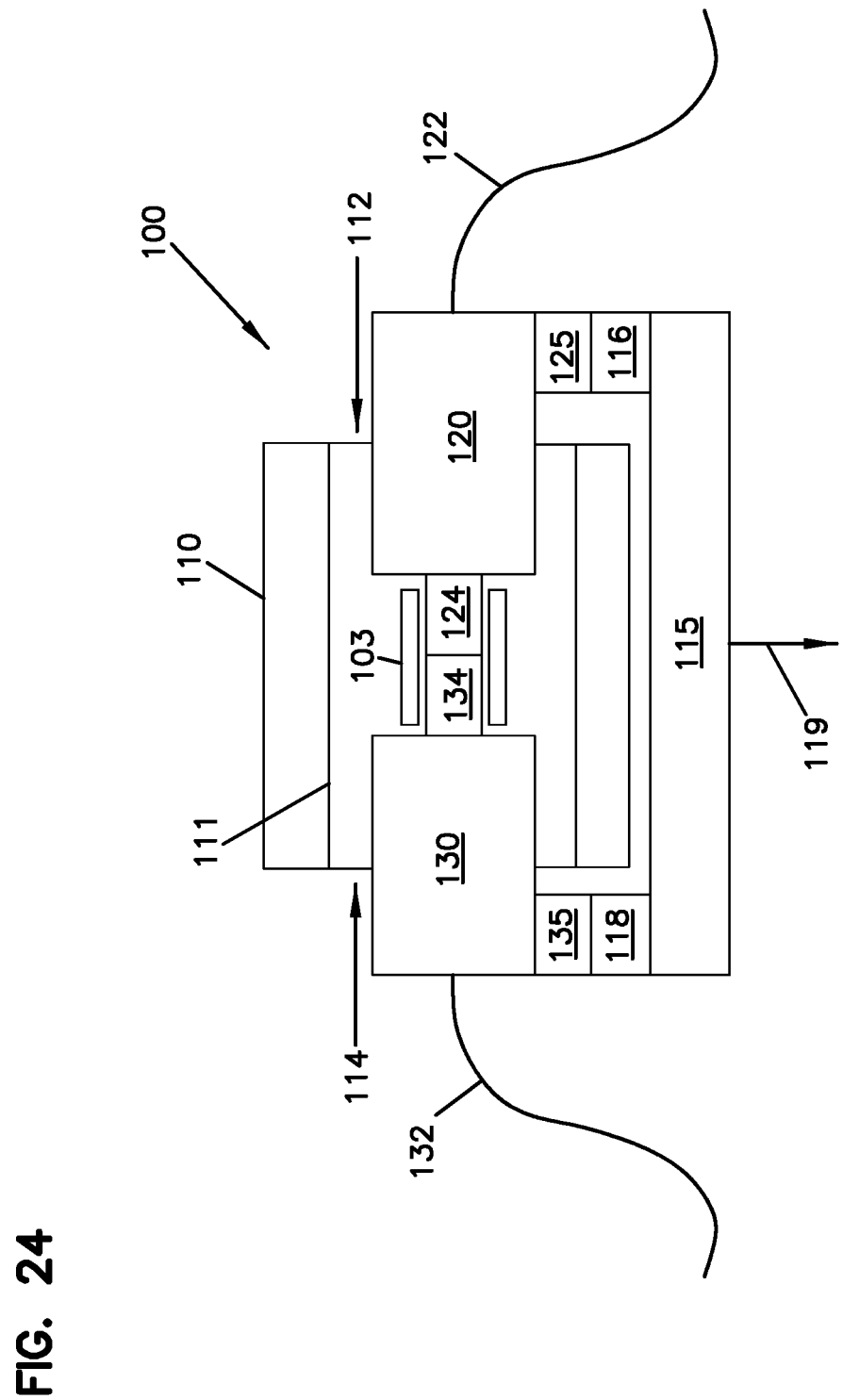
FIG. 24 is a schematic diagram showing two optical connectors with physical layer storage inserted at an optical adapter having media reading interfaces to access the physical layer storage of the connectors.

FIG. 24 is a schematic diagram of one example connection system 300 including a connector assembly (e.g., optical adapters, electrical sockets, wireless readers, etc.) 310 at which communications signals from a first media segment (e.g., an optical fiber, an electrical conductor, a wireless transceiver, etc.) 322 pass to another media segment 332. In some implementations, the media segments 322, 332 are terminated by connector arrangements 320, 330, respectively. The example connector assembly 310 connects segments of optical communications media in an optical network. In other implementations, however, the connector assembly 310 can connect electrical segments, wireless segments, or some combination thereof.

The connector assembly 310 includes a fiber optic adapter defining at least one connection opening 311 having a first port end 312 and a second port end 314. A sleeve (e.g., a split sleeve) 303 is arranged within the connection opening 311 of the adapter 310 between the first and second port ends 312, 314. Each port end 312, 314 is configured to receive a connector arrangement 320. Each fiber connector arrangement 320, 330 includes a ferrule 324, 334 through which optical signals from the optical fiber 322, 332, respectively, pass. The ferrules 324, 334 are held and aligned by a sleeve 303 to allow optical signals to pass between the ferrules 324, 334. The aligned ferrules 324, 334 of the connector arrangements 320, 330 create an optical path along which the communication signals may be carried.

In accordance with aspects of the disclosure, the communications network is coupled to or incorporates a data management system that provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the communications network. As the term is used herein, "PLM functionality" refers to the ability of a component or system to manipulate or to enable others to manipulate the physical components used to implement the physical layer of the communications network (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications network. Physical layer information of the communications network can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

For example, the connector assembly 310 of FIG. 24 can be configured to collect physical layer information from the connector arrangements 320, 330 terminating one or more of the media segments 322, 332. In some implementations, the first connector arrangement 320 may include a storage device 325 that is configured to store physical layer information pertaining to the segment of physical communications media 322 and/or to the first connector arrangement 320. In certain implementations, the connector arrangement 330 also includes a storage device 335 that is configured to store information pertaining to the second connector arrangement 330 and/or to the second optic cable 332 terminated thereby.

In one implementation, each of the storage devices 325, 335 is implemented using an EEPROM (e.g., a PCB surface-mount EEPROM). In other implementations, the storage devices 325, 335 are implemented using other non-volatile memory device. Each storage device 325, 335 is arranged and configured so that it does not interfere or interact with the communications signals communicated over the media segments 322, 332.

In accordance with some aspects, the adapter 310 is coupled to at least a first media reading interface 316. In certain implementations, the adapter 310 also is coupled to at least a second media interface 318. In certain implementations, the adapter 310 is coupled to multiple media reading interfaces. In an example, the adapter 310 includes a media reading interface for each port end defined by the adapter 310. In another example, the adapter 310 includes a media reading interface for each connection opening 311 defined by the adapter 310. In other implementations, the adapter 310 can include any desired number of media reading interfaces 316, 318.

In some implementations, at least the first media reading interface 316 is mounted to a printed circuit board 315. In some implementations, the printed circuit board 315 also can include the second media reading interface 118. The printed circuit board 315 of the adapter 310 can be communicatively connected to one or more programmable processors and/or to one or more network interfaces (see data line 319 of FIG. 24). The network interface may be configured to send the physical layer information to a physical layer data management network. Examples of data management networks can be found in U.S. Provisional Application No. 61/760,816, filed Feb. 5, 2013, and titled "Systems and Methods for Associating Location Information with a Communication Sub-Assembly Housed within a Communication Assembly," the disclosure of which is hereby incorporated herein by reference.

When the first connector arrangement 320 is received in the first port end 312 of the adapter 310, the first media reading interface 316 is configured to enable reading (e.g., by an electronic processor) of the information stored in the storage device 125. The information read from the first connector arrangement 320 can be transferred through the printed circuit board 315 to the physical layer data management network. When the second connector arrangement 330 is received in the second port end 314 of the adapter 110, the second media reading interface 318 is configured to enable reading (e.g., by an electronic processor) of the information stored in the storage device 335. The information read from the second connector arrangement 330 can be transferred through the printed circuit board 315 or another circuit board to the physical layer data management network.

In some such implementations, the storage devices 325, 335 and the media reading interfaces 316, 318 each include at least three (3) leads—a power lead, a ground lead, and a data lead. The three leads of the storage devices 325, 335 come into electrical contact with three (3) corresponding leads of the media reading interfaces 316, 318 when the corresponding media segment is inserted in the corresponding port. In other example implementations, a two-line interface is used with a simple charge pump. In still other implementations, additional leads can be provided (e.g., for potential future applications). Accordingly, the storage devices 325, 335 and the media reading interfaces 316, 318 may each include four (4) leads, five (5) leads, six (6) leads, etc.

Figure 1:
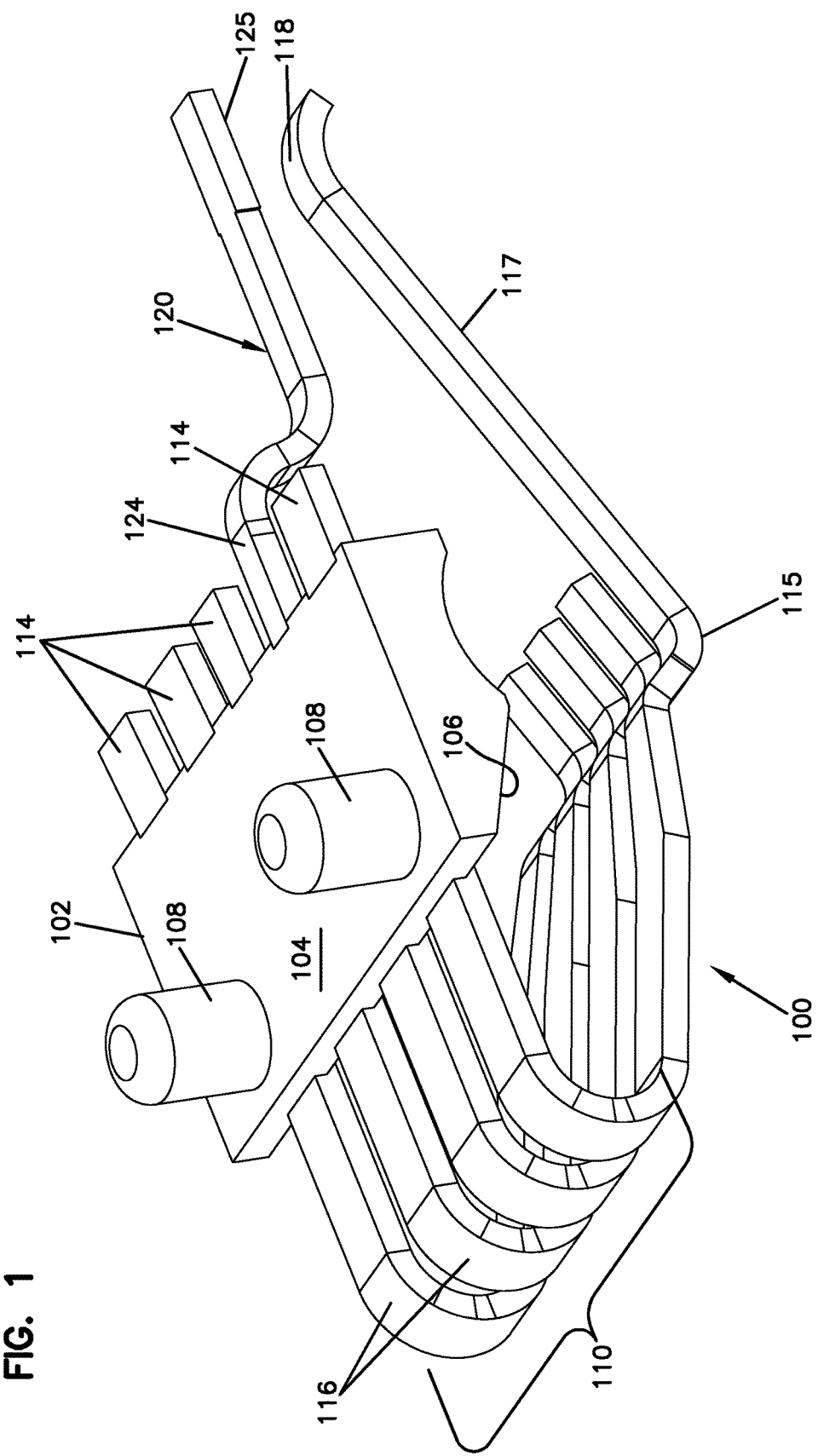
FIG. 1 is a perspective view of an example contact assembly including plug contact members and a sensing contact overmolded together.

FIGS. 1-5 illustrate a contact assembly 100 suitable for implementing any of the media reading interfaces 316, 318 of FIG. 24. The contact assembly 100 has a first end 101, a second end 103, a first side 105, and a second side 107 (see FIG. 3). The contact assembly 100 includes one or more plug contact members 110; a sensing contact 120; and a body 102 that retains the plug contact members 110 and the sensing contact member 120 (FIG. 1). Each of the plug contact members 110 and the sensing contact 120 are laterally spaced from each other. The plug contact members 110 extend from the body 102 towards the first and second sides 105, 107 of the contact assembly 100. The sensing contact 120 extends from the body 102 only towards the second side 107 of the contact assembly 100.

Figure 2:
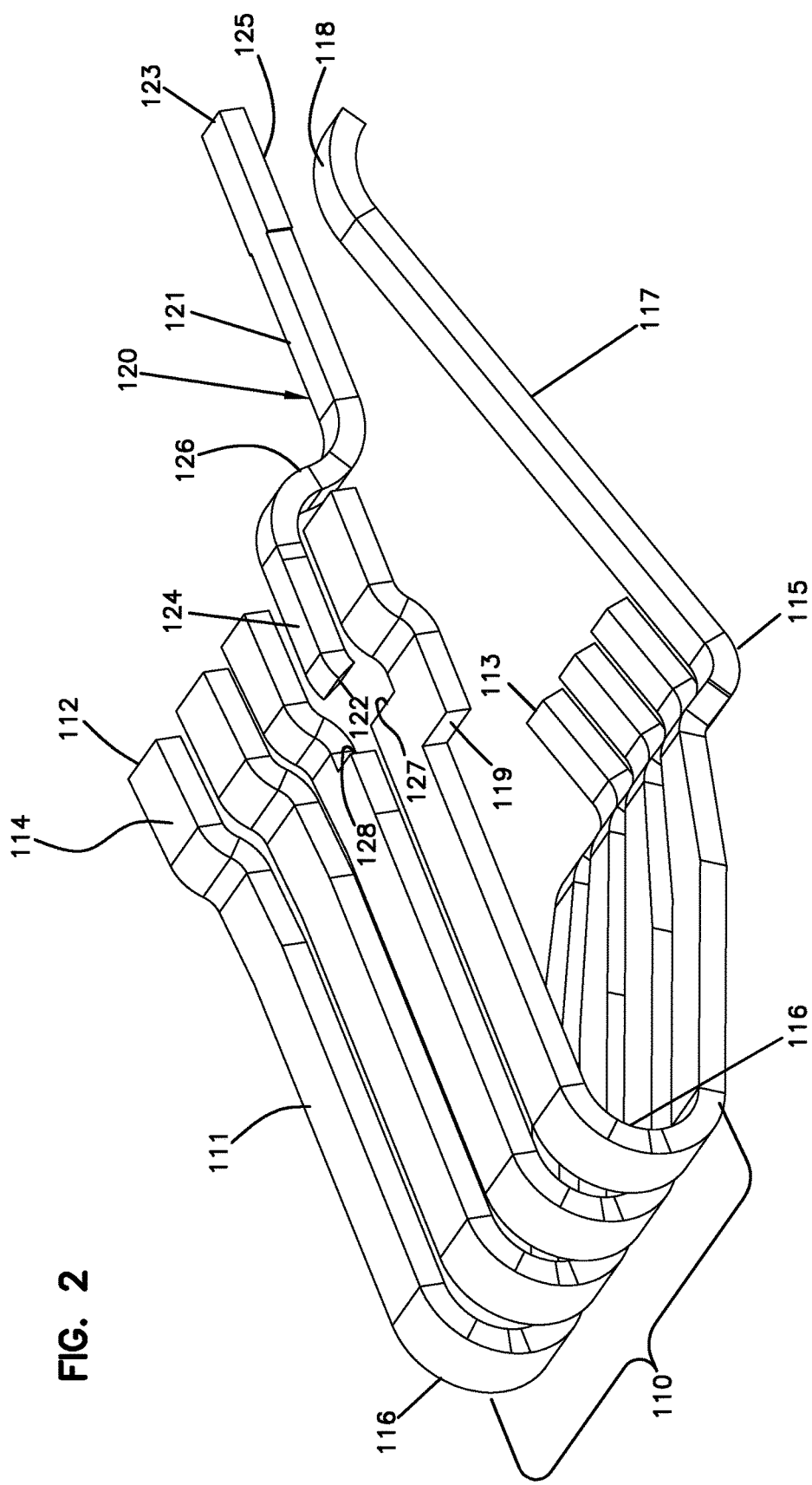
FIG. 2 is a perspective view of the plug contact members and sensing contact of FIG. 1 shown with the overmold removed.
Figure 3:
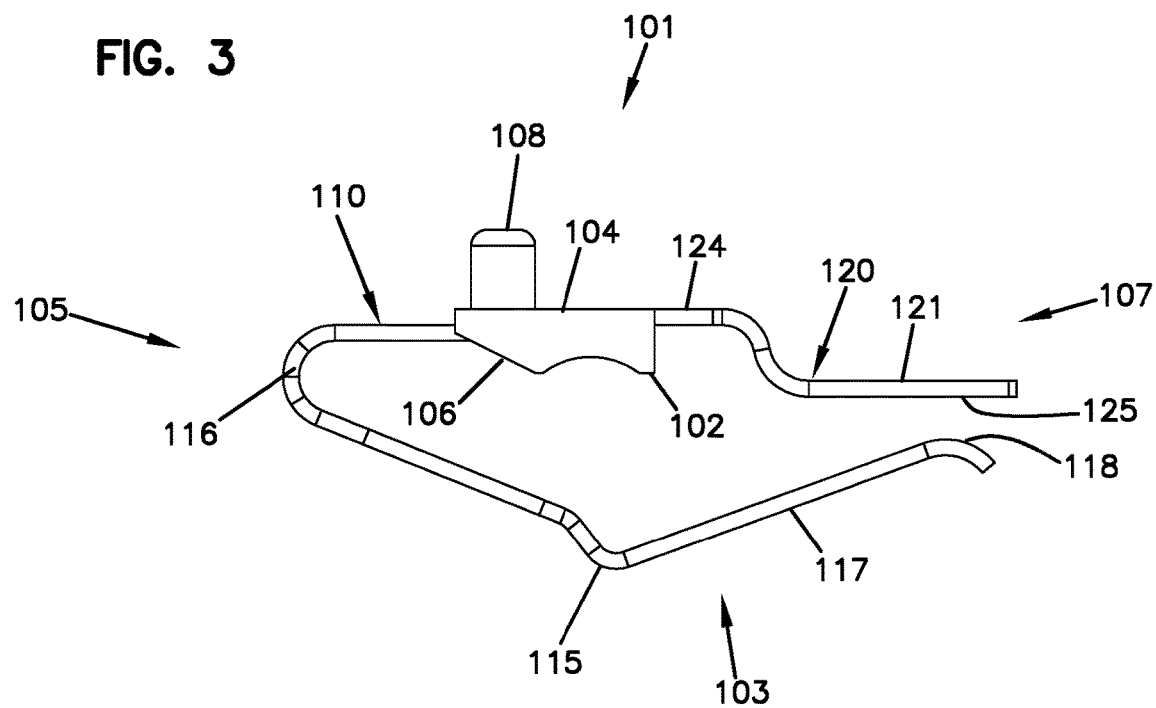
FIG. 3 is a side elevational view of the contact assembly of FIG. 1 shown in an undeflected position.
Figure 4:
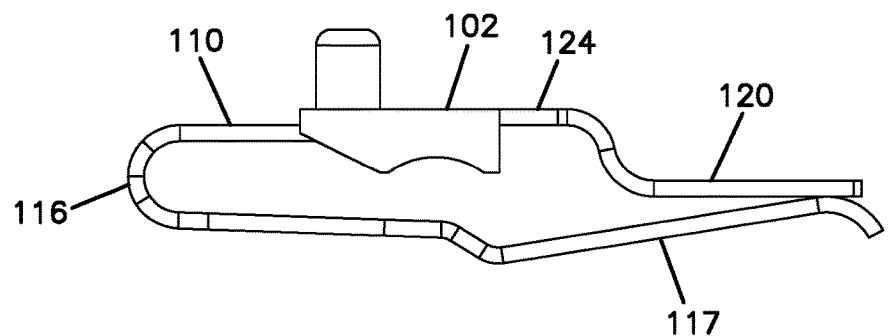
FIG. 4 is a side elevational view of the contact assembly of FIG. 1 shown in a deflected position.

Each plug contact member 110 includes a body 111 extending from a first end 112 to a second end 113 (FIG. 2). Each plug contact member 110 defines a first contact section 114 at the first end 112 of the body 111 and a second contact section 115 that is located closer to the second end 113 of the body 111 than the first contact section 114. The first and second contact sections 114, 115 of some of the plug contact members 110 can align along a non-lateral direction. For example, the contact sections 114, 115 of some of the plug contact members 110 can align along a first direction extending between the first and second ends 101, 103 of the contact assembly 100.

A resilient section 116 is disposed between the first and second contact sections 114, 115 of each plug contact member body 111 to enable movement of the second contact section 115 relative to the first contact section 114. For example, the resilient section 116 may enable movement of at least one of the contact sections 114, 115 along the first direction. At least a first of the plug contact members 110 also defines a third contact section 118. In the example shown, the third contact section 118 is defined at a distal end of an extension 117 that couples to the second contact section 115 of the first plug contact member 110.

The sensing contact 120 includes a body 121 extending from a first end 122 to a second end 123 (FIG. 2). The sensing contact 120 defines a first contact section 124 at the first end 122 of the body 121. The first contact section 124 generally aligns with the first contact sections 114 of the plug contact members 110. The sensing contact 120 also includes a second contact section 125 at the second end 123 of the body 121. The second contact section 125 of the sensing contact 120 aligns with the third contact section 118 of the first plug contact member 110 along a non-lateral direction. For example, movement of the extension 117 of the first plug contact member 110 along the non-lateral direction may bring the third contact section 118 of the first plug contact member 110 into physical contact (e.g., via a wiping movement) with the second contact section 125 of the sensing contact 120 (compare FIGS. 3 and 4).

In some implementations, the body 121 of the sensing contact 120 includes a contoured section 126 between the first and second ends 122, 123. The contoured section positions the second contact section 125 closer to the third contact section 118. In some implementations, the plug contact members 110 are configured to accommodate the first contact section 124 of the sensing contact 120. For example, in certain implementations, the first plug contact member 110 includes a lateral extension 119 that shifts the first contact section 114 of the first plug contact member 110 to be offset from the corresponding second contact section 115 along the lateral direction. The shift created by the lateral extension forms a recess 127 for accommodating the first end 122 of the sensing contact (see FIG. 2). In certain implementations, an adjacent one of the plug contact members 110 also may define a recess 128 for accommodating the first end 122 of the sensing contact.

The body 102 (FIG. 1) holds the contact members 110, 120 in the laterally spaced configuration shown in FIG. 2. In an example, the body 102 is formed by overmolding the plug contact members 110 and the sensing contact 120 in the laterally spaced configuration. The body 102 defines a first surface 104 facing towards the first end 101 of the contact assembly 100. In an example, the first surface 104 is generally planar. In certain implementations, a ramped surface 106 faces towards the first side 105 and second end 103 of the contact assembly 100. The ramped surface 106 accommodates movement of the plug contact members 110 when the second contact surfaces 115 move towards the first contact surfaces 114. In certain implementations, the body 102 also includes one or more securement structures to aid in mounting the contact assembly 100 to a printed circuit board or other structure. In the example shown in FIG. 1, the securement structures include two pegs 108 that extend towards the first end 101 of the contact assembly 100.

Figure 5:
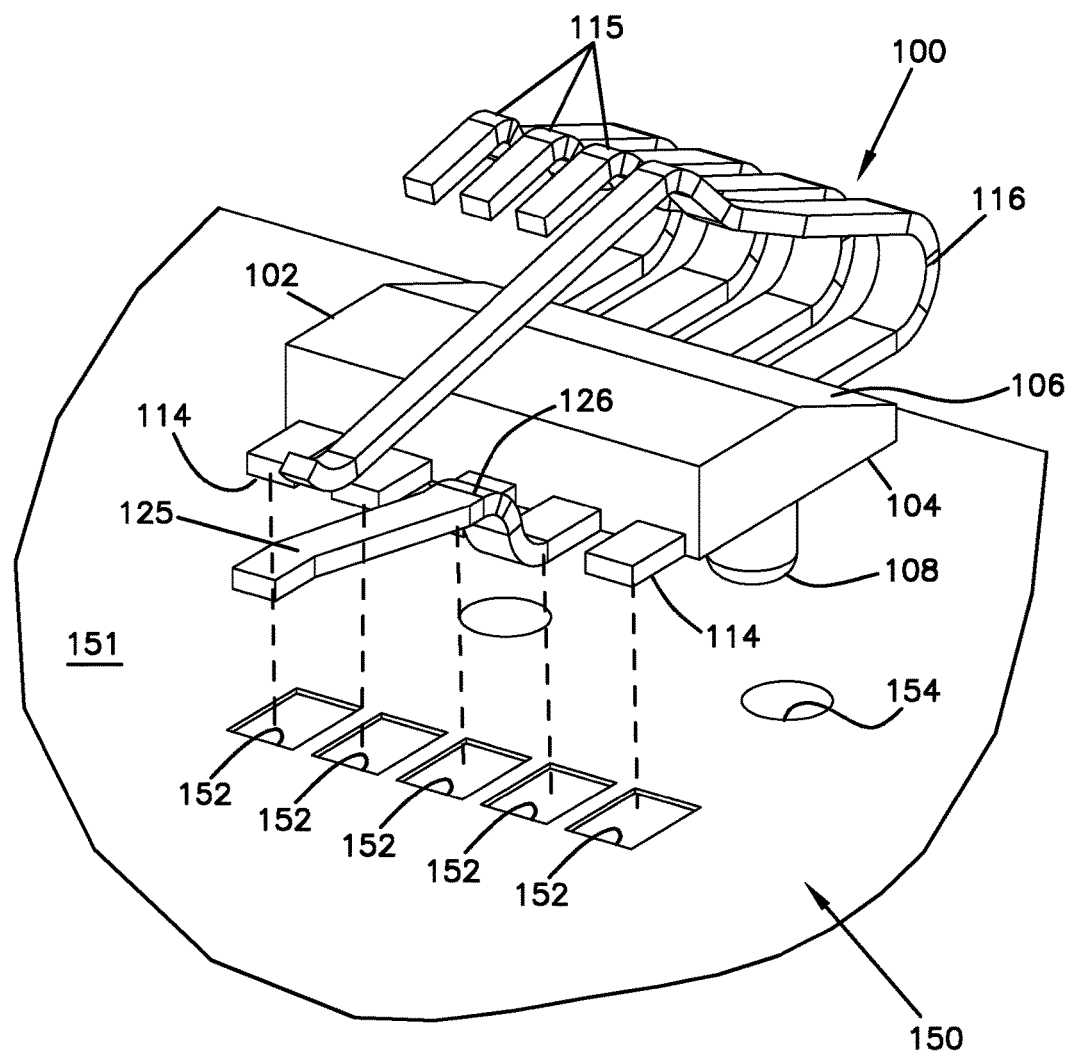
FIG. 5 is a perspective view of the contact assembly of FIG. 1 exploded outwardly from a circuit board.

As shown in FIG. 5, the contact assembly 100 can be mounted to a printed circuit board 150 or other structure. The first surface 104 of the contact assembly body 102 lies on a first surface 151 of the board 150. In certain implementations, the printed circuit board 150 includes contact pads 152 that align with and touch the first contact sections 114 of the plug contact members 110 and the first contact section 124 of the sensing contact 120. The pegs 108 aid in aligning the contact assembly 100 on the board 150 (e.g., via alignment holes 154 defined in the board 150). As shown, the contoured section 126 of the sensing contact 120 raises the second end 123 of the sensing contact 120 away from the board 150. The second contact sections 115 of the plug contact members 110 extend upwardly from the board 150 to mate with corresponding contacts of a plug connector or other connector arrangement to be electrically coupled to the board 150.

When a plug connector having corresponding contacts mates with the contact assembly, the plug connector contacts are brought into electrical contact with the second contact sections 115 of the plug contact members 110. Accordingly, electrical signals can be passed from the plug connector contacts to the contacts pads 152 of the circuit board 150 via the plug contact members 110. For example, the plug contact members 110 can provide a power line, a grounding line, and a data line between the plug connector contacts and the board 150.

In certain implementations, the plug connector contacts or the plug connector, itself, can press upon the second contact sections 115 to deflect portions of the plug contact members 110. For example, one of the plug connector contacts can cause deflection of the extension 117 of the first plug contact member 110 towards the sensing contact 120. When the third contact section 118 touches the sensing contact 120, the first plug contact member 110 and the sensing contact 120 electrically connect together (i.e., short) two of the contact pads 152 of the board 150. In particular, the first plug contact member 110 and the sensing contact 120 electrically connect the contact pad 152 coupled to the first contact section 114 of the first plug contact member 110 and the contact pad 152 coupled to the first contact section 124 of the sensing contact 120. A processor coupled to the board 150 (either directly or remotely) can interpret the shorting of the two contact pads 152 as indicating the presence of a plug connector. In other implementations, however, the sensing contact 120 can be replaced by a metal contact pad on the circuit board 150 that the third contact section 118 touches to complete the circuit.

In general, the contact assembly 100 is configured to be mounted to an adapter block assembly that connects the contact assembly 100 to a data network. In certain implementations, the adapter block assembly has PLI functionality as well as PLM functionality. The contact assembly 100 transfers data and/or power between the optical adapter and the network. The contact assembly 100 also can determine when a plug connector is present at the optical adapter as noted above. The contact assembly 100 also is configured to mate with a contact arrangement disposed on or in a plug connector to be received at a port of the optical adapter. Information can be transferred between the plug connector and the data network via the contact arrangement, the contact assembly 100, and the adapter block assembly. Additional information about how physical layer information can be read from the plug connectors by the contact assemblies at adapters can be found in U.S. Publication No. 2011-0262077, the disclosure of which is hereby incorporated herein by reference.

In some implementations, the contact assembly 100 can be disposed in an aperture defined in the optical adapter. The first contact sections 114, 124 of the contact members 110, 120 couple to a circuit board 150 that mounts to the adapter and the second contact sections 115 of the plug contact members 110 extend towards the adapter port for connection with a plug connector. Some types of optical adapters include a single contact assembly 100. Other types of optical adapters include two contact assemblies 100. For example, certain types of optical adapters may include two contact assemblies 100 for opposing ports. Still other types of adapters include more than two contact assemblies 100 (e.g., adapters having more than two ports).

In some implementations, the contact assemblies 100 can be mounted to a common side of the optical adapter. For example, LC-type optical adapters may have multiple contact assemblies 100 mounted to one side of the adapter. In other implementations, the contact assemblies 100 can be mounted to opposite sides of the optical adapter. For example, MPO-type optical adapters may have a first contact assembly 100 mounted to a top of the optical adapter and a second contact assembly 100 mounted to a bottom of the optical adapter. In such cases, the first contact assembly 100 is associated with a first port of the MPO-type adapter and the second contact assembly 100 is associated with a second port of the MPO-type adapter.

Figure 10:
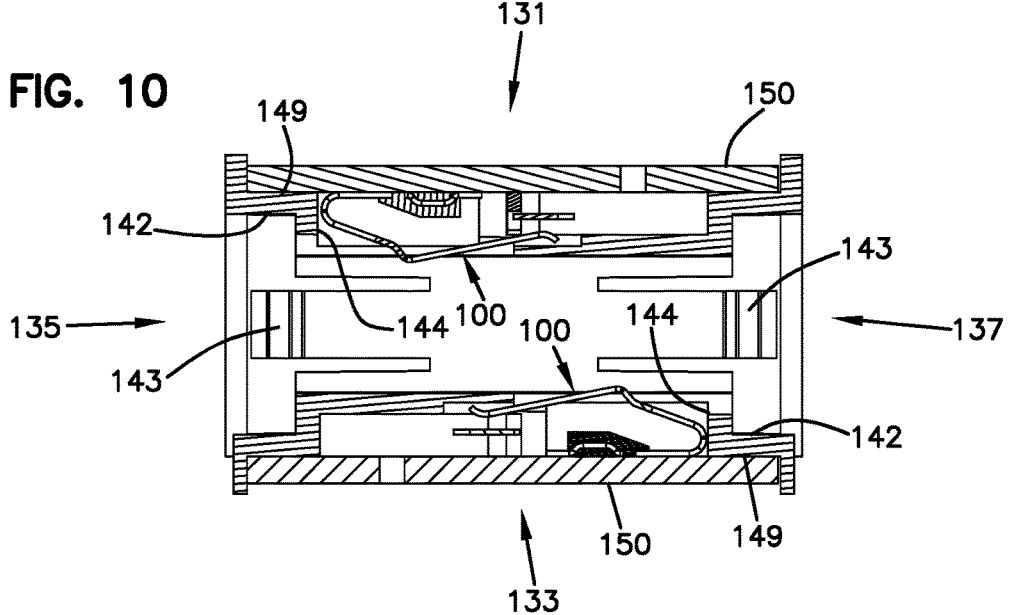
FIG. 10 is a cross-sectional view of the adapter block assembly of FIG. 9 taken along the 10-10 line of FIG. 9.

FIGS. 6-10 illustrate one example adapter block assembly 130 having a first end 131, a second end 133, a first side 135, and a second side 137 (FIG. 10). The adapter block assembly 130 includes at least one contact assembly 100 mounted to at least one optical adapter 140. In some implementations, the adapter block assembly 130 includes multiple optical adapters 140 that each include one or more contact assemblies 100. In certain implementations, an adapter block assembly 130 includes between two and twenty-four optical adapters 140. In example implementations, an adapter block assembly 130 includes between four the sixteen optical adapters 140. In an example, an adapter block assembly 130 includes twelve optical adapters 140. In an example, an adapter block assembly 130 includes eight optical adapters 140. In some implementations, the optical adapters 140 can be arranged in a straight row. In other implementations, the optical adapters 140 can be offset from each other to form a staggered configuration.

Figure 7:
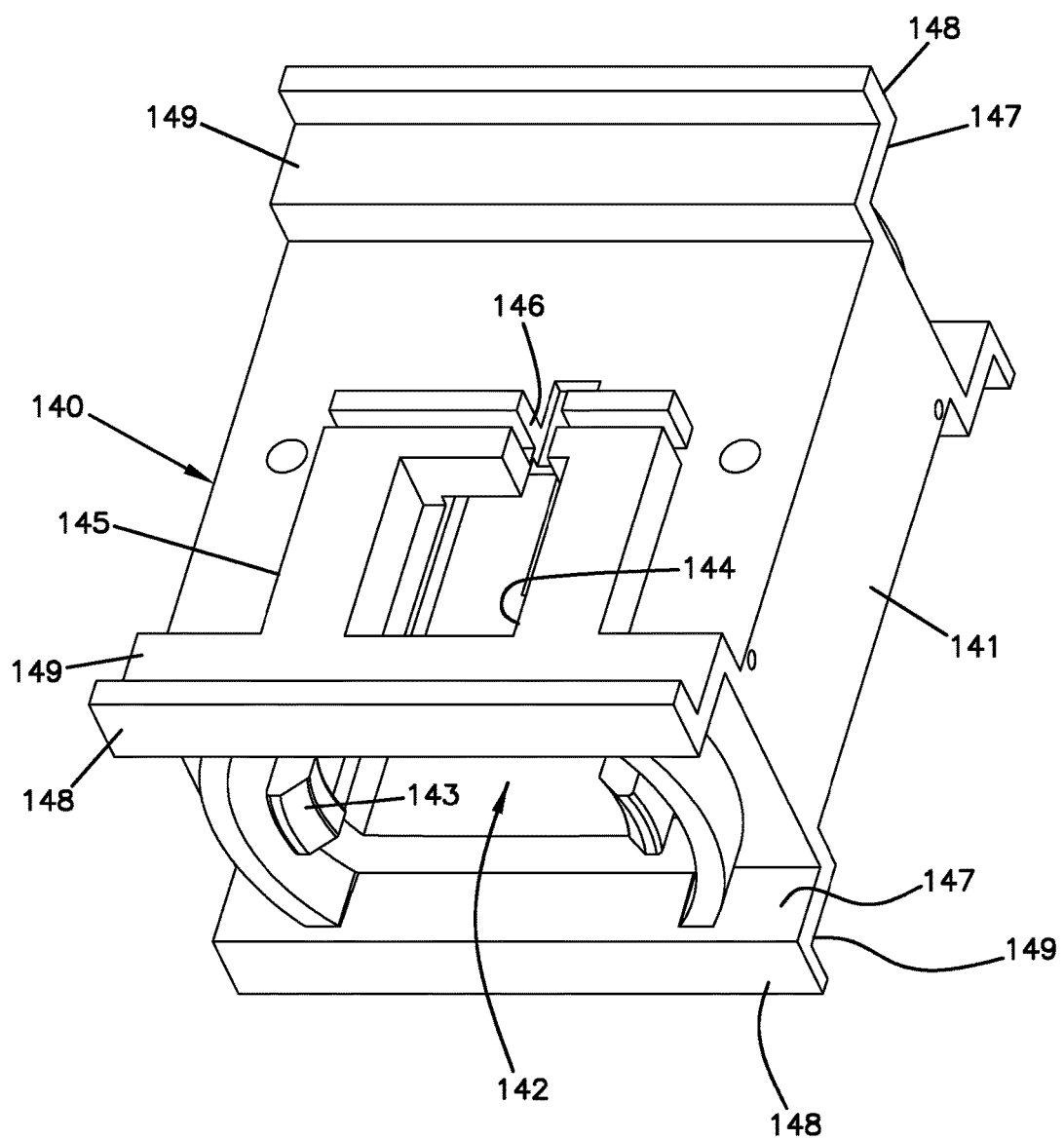
FIG. 7 is a perspective view of an example optical adapter of FIG. 6.

Each adapter 140 has a body 141 defining two or more ports 142 at which plug connectors can be received (FIG. 7). Latching arms 143 can be disposed at the ports 142 to aid in retaining the plug connectors at the ports 142. At least a first of the ports 142 faces towards the first side 135 and at least a second of the ports 142 faces towards the second side 137. In some implementations, an optical adapter 140 defines one pair of opposing ports 142. In other implementations, an optical adapter 140 defines multiple pairs of opposing ports 142. In the example shown, the optical adapter 140 is an MPO-type adapter. In other implementations, however, the optical adapter 140 can be any desired type of optical adapter (e.g., an LC-type adapter, an SC-type adapter, an LX.5-type adapter, etc.).

An optical adapter 140 also defines at least one aperture 144 at which a contact assembly 100 can be disposed. In some implementations, an optical adapter 140 defines two or more apertures 144. In certain implementations, an optical adapter 140 defines an aperture 144 for each port 142. For example, the optical adapter 140 shown in FIG. 10 defines a first aperture 144, which faces towards the first end 131 of the adapter block assembly 130 and is associated with the first port 142, and a second aperture 144, which faces towards the second end 133 and is associated with the second port 142. In other implementations, the apertures 144 may be defined in a common surface of the adapter 140.

In some implementations, a support wall 145 at least partially surrounds the aperture 144. The support wall 145 provides some protection for the contact assembly 100 mounted in the aperture 144. The contact assembly 100 is mounted within the support wall 145 and aperture 144 so that the first end 101 of the contact assembly 100 does not protrude from the wall 145. For example, the first end 101 of the contact assembly 100 can be mounted flush with the support wall 145 or recessed below the support wall 145. In certain implementations, the pegs 108 of the contact assembly 100 extend past the wall 145 (see FIG. 8). The second end 103 of the contact assembly 100 extends through the aperture 144 into an interior of the adapter body 141.

In certain implementations, the support wall 145 may define a notch 146 facing away from the corresponding port 142. The notch 146 accommodates the sensing contact 120 and the extension 117 of the plug contact member 110. The aperture 144 extends along the slot 146 to further accommodate the sensing contact 120 and the extension 117. In the example shown in FIG. 7, the aperture 144 extends past the slot 146. The notch 146 and aperture 144 accommodate deflection of the extension 117 relative to the sensing contact 120 to enable contact therebetween. As discussed above, contact between the third contact section 118 and the second contact section 125 of the sensing contact 120 shorts these two contacts together.

In some implementations, the adapter body 141 also includes ledges extending above and below the ports 142. Each ledge has a first flange 147 extending generally parallel to an insertion direction of the ports 142 and a second flange 148 extending generally orthogonal to the insertion direction of the ports 142. Two ledges cooperate at one end of the adapter body 141 to define a first recessed section 149 and two ledges cooperate at an opposite end of the adapter body 141 to define a second recessed section 149 (see FIG. 7).

Figure 9:
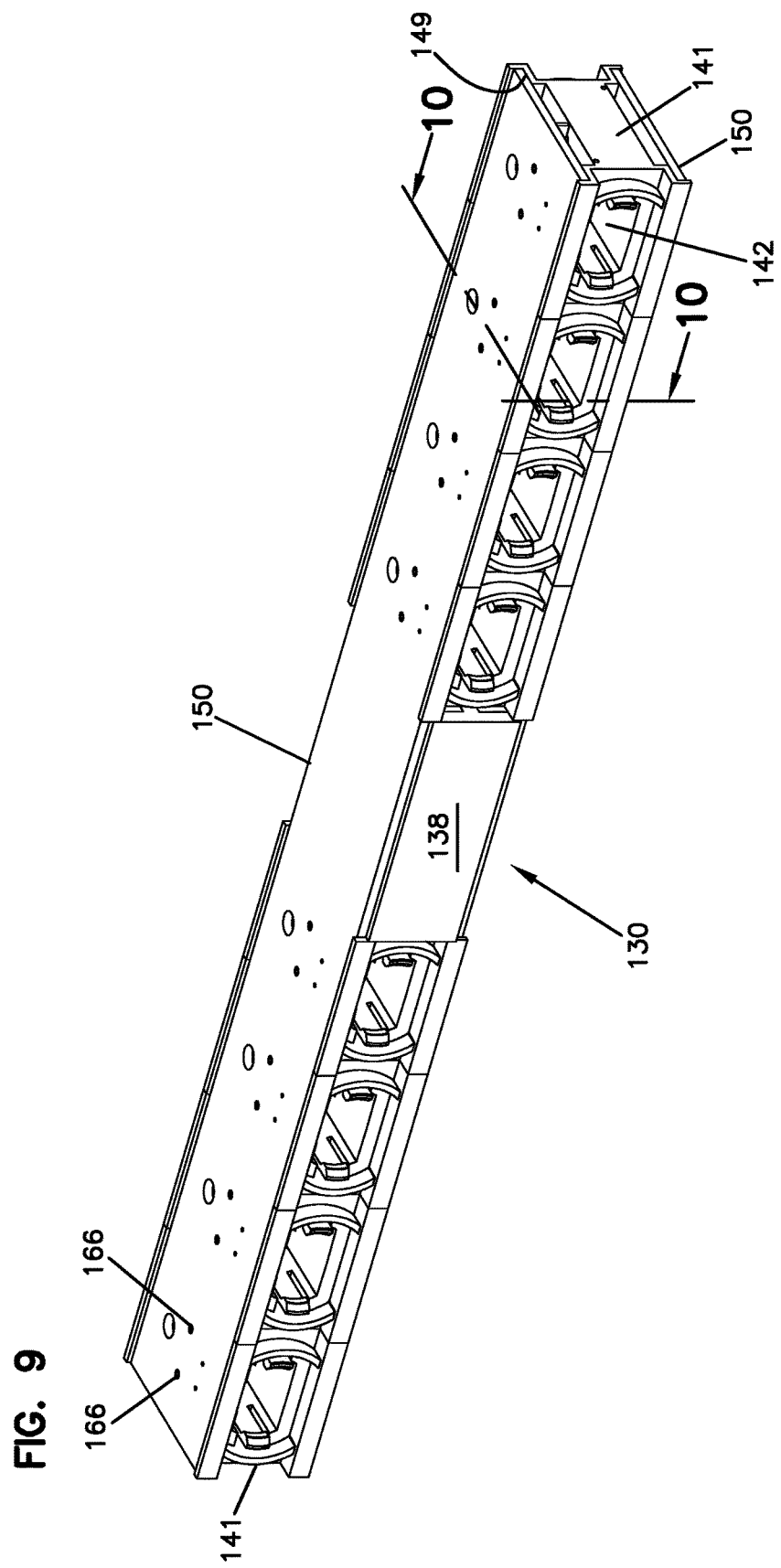
FIG. 9 is a perspective view of the first adapter block assembly of FIG. 6 shown assembled.

The adapter block assembly 130 also includes a circuit board 150 that can be secured to the first recess 149 of one or more optical adapters 140 to extend across the adapters 150 (see FIG. 9). In certain implementations, the adapters 140 can be separated into a first group 132 and a second group 134 that are separated by a gap 136. The first group 132 can be disposed at one side of the circuit board 150 and the second group 134 can be disposed at an opposite side of the circuit board 150. In some implementations, the adapter block assembly 130 also includes a second circuit board 150 that secures to the second recess 149 of one or more of the adapters 140 and extends across an opposite side of the adapters 140. In certain implementations, the second circuit board 150 extends across all of the adapters 140. In other implementations, the second circuit board 150 extends across the adapters 140 of one of the groups 132, 134.

In some implementations, the first and second circuit boards 150 are coupled together via a board connector. For example, a board connector can extend between the first and second circuit boards 150 between the groups 132, 134 of optical adapters 140. In such cases, one of the boards 150 can include a network interface or both otherwise connected to a data network. The other one of the boards 150 can be connected to the network via the first board 150. One or more walls 138 or other structures can extend between the bodies 141 of the inner adapters 140 of the two groups 132, 134 to protect the board connector. In other implementations, the second board 150 may connect directly to a flex circuit or other connection circuitry over which the adapter block assembly 130 can be mounted. In such an implementation, the board connector may extend from the first board 150, through the gap 136, to the connection circuitry.

The board 150 is positioned to hold at least some of the contact assemblies 100 to the adapters 140. Accordingly, deflection of the second contact sections 115 of the plug contact members 110 by an insertion of a plug connector at an adapter port 142 will not push the contact assembly 100 out of the aperture 144. Rather, the contact assembly 100 is retained within the aperture 144 by the board 150. In some implementations, the boards 150 are mounted flush with the adapters 140. For example, each of the boards 150 is mounted in the respective recess 149 so that an outward surface of the board 150 is level with distal ends of the corresponding ledges defining the recess 149.

Figure 6:
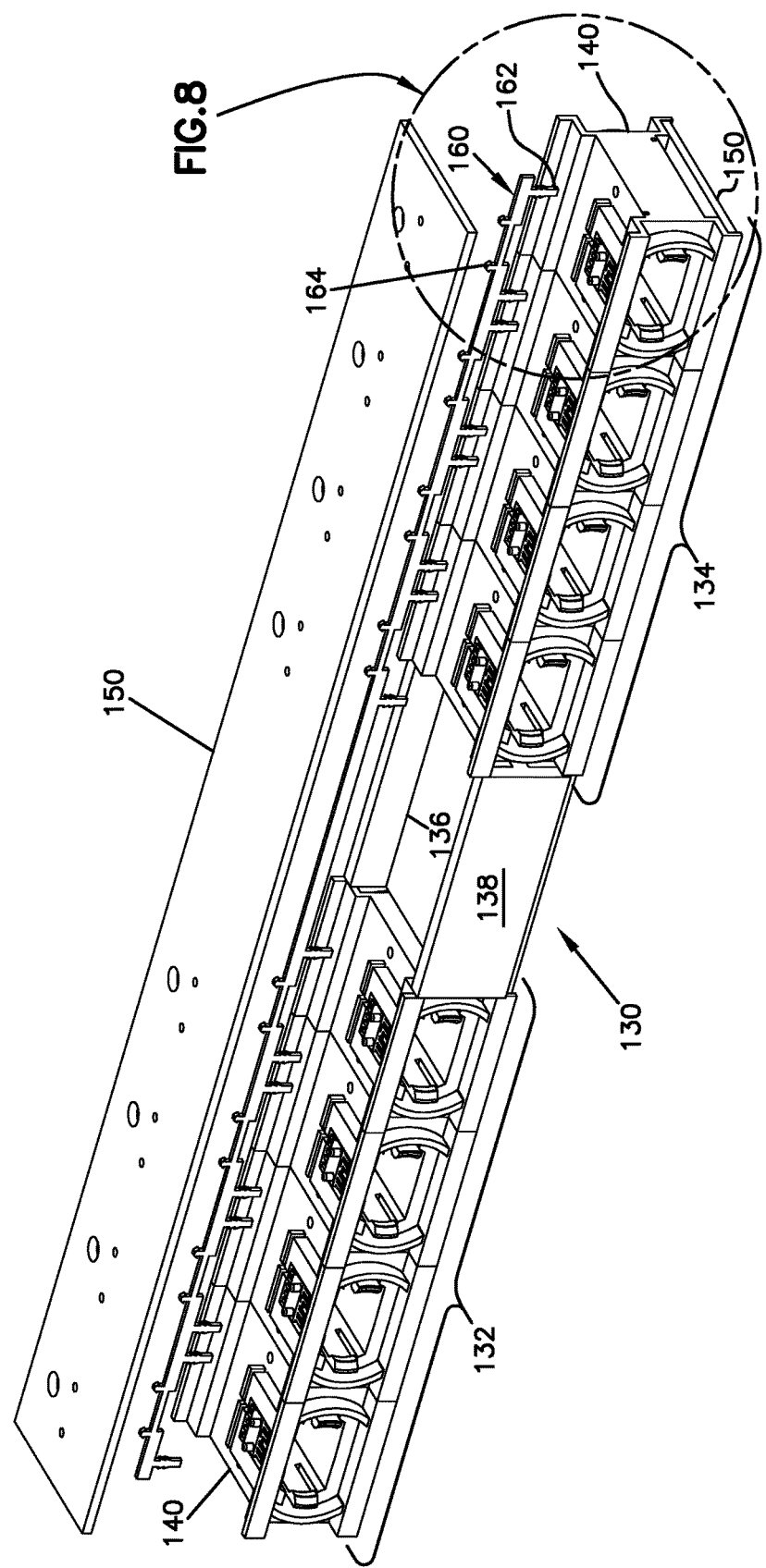
FIG. 6 is a perspective view of a first example adapter block assembly including a cover and a retention mechanism exploded outwardly from optical adapters.
Figure 8:
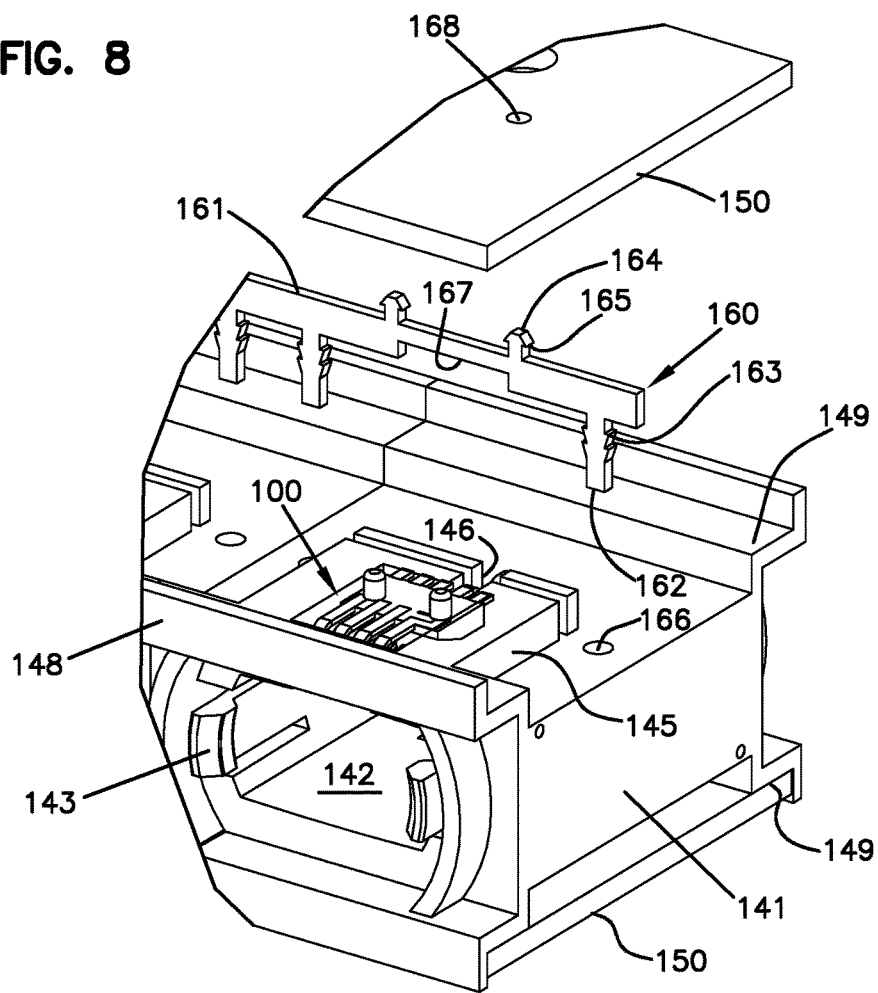
FIG. 8 is an enlarged view of a portion of FIG. 6.

FIGS. 6 and 8 illustrate one example mechanism for holding the circuit board 150 to the adapter 140. A retention member 160 is disposed between the adapter 140 and the board 150. The retention member 160 includes an elongated body 161 extending across one or more adapters 140 adjacent the apertures 144. First prongs 162 extend from the body 161 in a first direction towards the adapters 140. The first prongs 162 are configured to secure to the bodies 141 of the adapters 140. For example, the first prongs 162 are configured to fit within openings 166 defined by the adapter bodies 141. In certain implementations, the first prongs 162 have barbs 163 that aid in securing the first prongs 162 within the adapter openings 166.

Second prongs 164 extend from the body 161 in a second direction towards the board 150. The second prongs 164 are configured to secure to the board 150. For example, the second prongs 164 are configured to fit within openings 168 defined by the board 150. In certain implementations, the second prongs 164 have one or more barbs 165 that aid in securing the second prongs 164 within the board openings 168. The second prongs 164 are arranged on the body 161 to be located closer to the contact assemblies 100 than the first prongs 162. Accordingly, the second prongs 164 hold the board 150 securely at regions above the contact assemblies 100. In certain implementations, the elongated body 161 defines recessed or cutout portions 167 located above the contact assemblies 100. The recessed portions 167 accommodate at least the sensing contact 120.

FIGS. 11-15 illustrate another example implementation of an adapter block assembly 200 including optical adapters 210 and circuit boards 220, 225 configured to retain contact assemblies 100 therebetween. Another example retention mechanism is shown holding the circuit boards 220, 225 to the adapters 210. In particular, a first cover 230 and a second cover 235 are configured to hold the first and second circuit boards 220, 225, respectively, to the adapters 210. Accordingly, deflection of the second contact sections 115 of the plug contact members 110 by insertion of a plug connector at an adapter 210 will not push the contact assembly 100 out of engagement with either the adapter 210 or the board 220, 225. Rather, the contact assembly 100 is retained at the adapter 210 by the board 220, 225.

Figure 15:
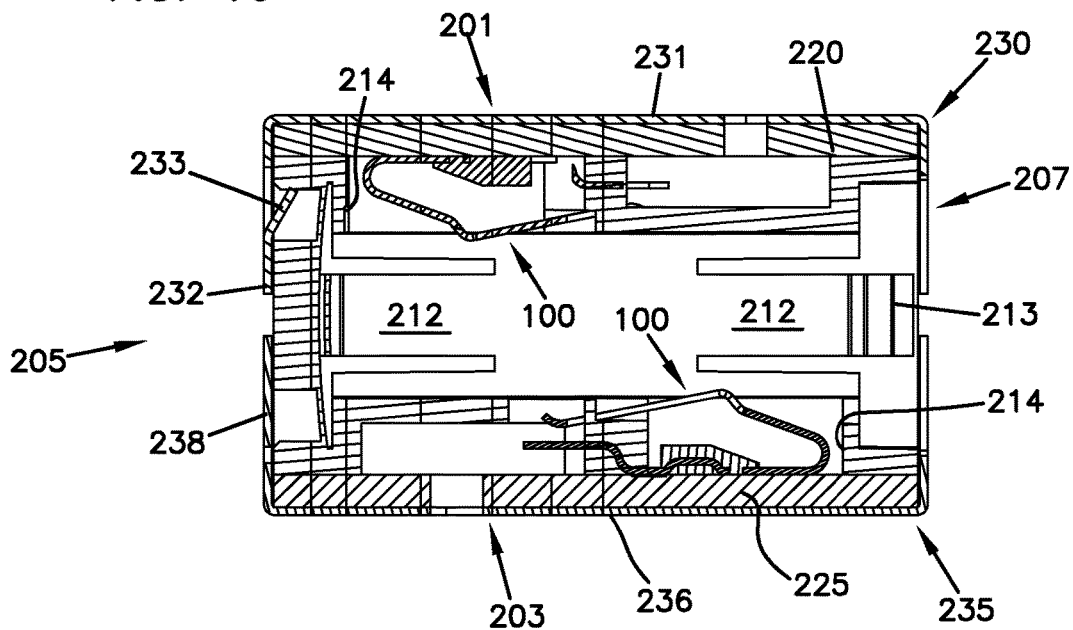
FIG. 15 is a cross-sectional view of the adapter block assembly of FIG. 13 taken along the 15-15 line of FIG. 13.
Figure 13:
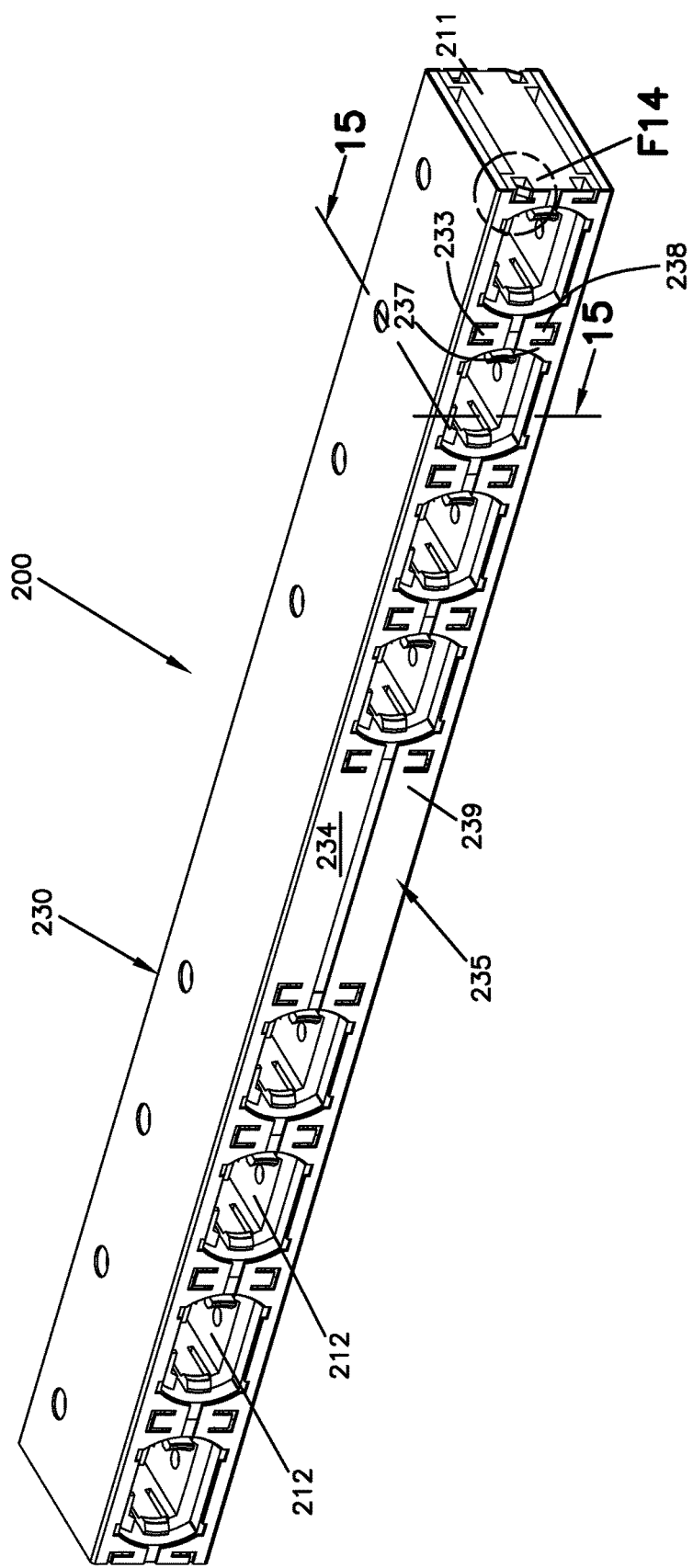
FIG. 13 is a perspective view of the first adapter block assembly of FIG. 11 shown assembled.
Figure 14:
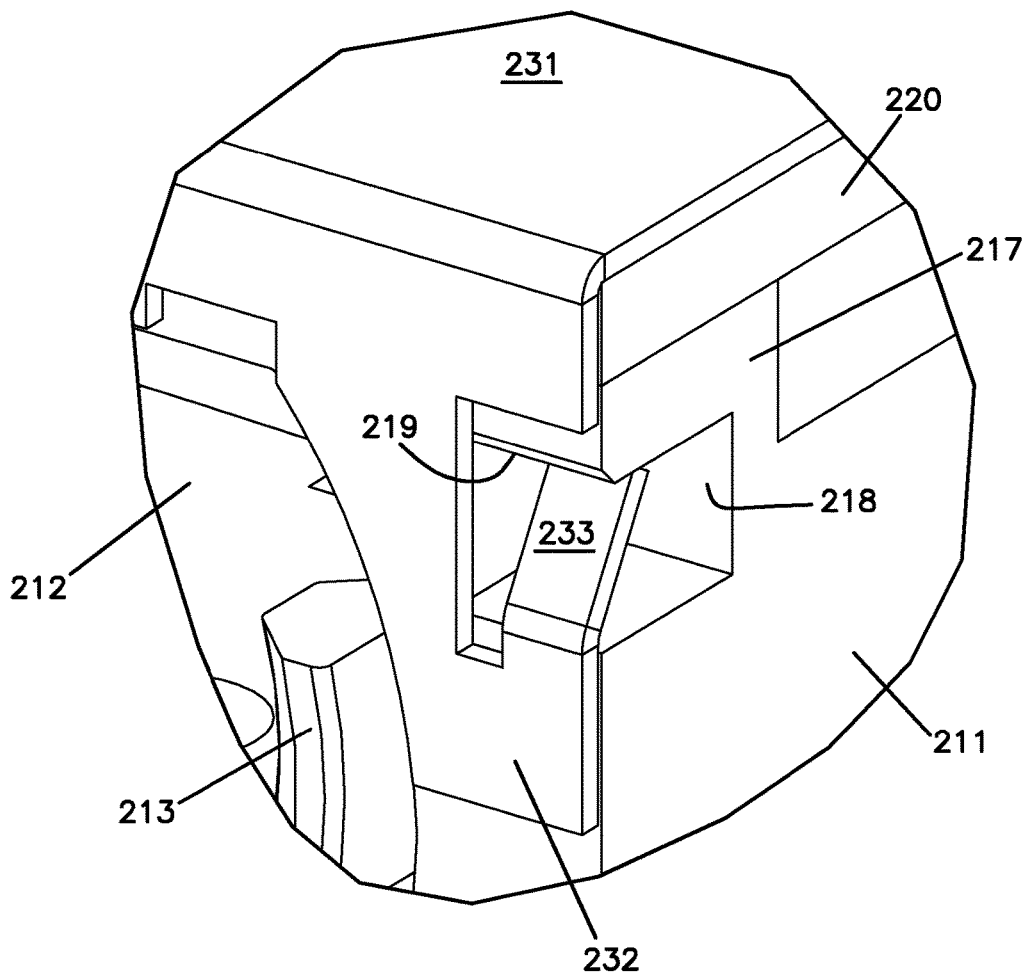
FIG. 14 is an enlarged view of a portion of FIG. 13.

The adapter block assembly 200 has a first end 201, a second end 203, a first side 205, and a second side 207 (FIG. 15). The adapter block assembly 200 includes at least one contact assembly 100 mounted to at least one optical adapter 210. In some implementations, the adapter block assembly 200 includes multiple optical adapters 210 that each include one or more contact assemblies 100. In certain implementations, an adapter block assembly 200 includes between two and twenty-four optical adapters 210. In example implementations, an adapter block assembly 200 includes between four the sixteen optical adapters 210. In an example, an adapter block assembly 200 includes twelve optical adapters 210. In an example, an adapter block assembly 200 includes eight optical adapters 210. In some implementations, the optical adapters 210 can be arranged in a straight row. In other implementations, the optical adapters 210 can be offset from each other to form a staggered configuration.

Figure 12:
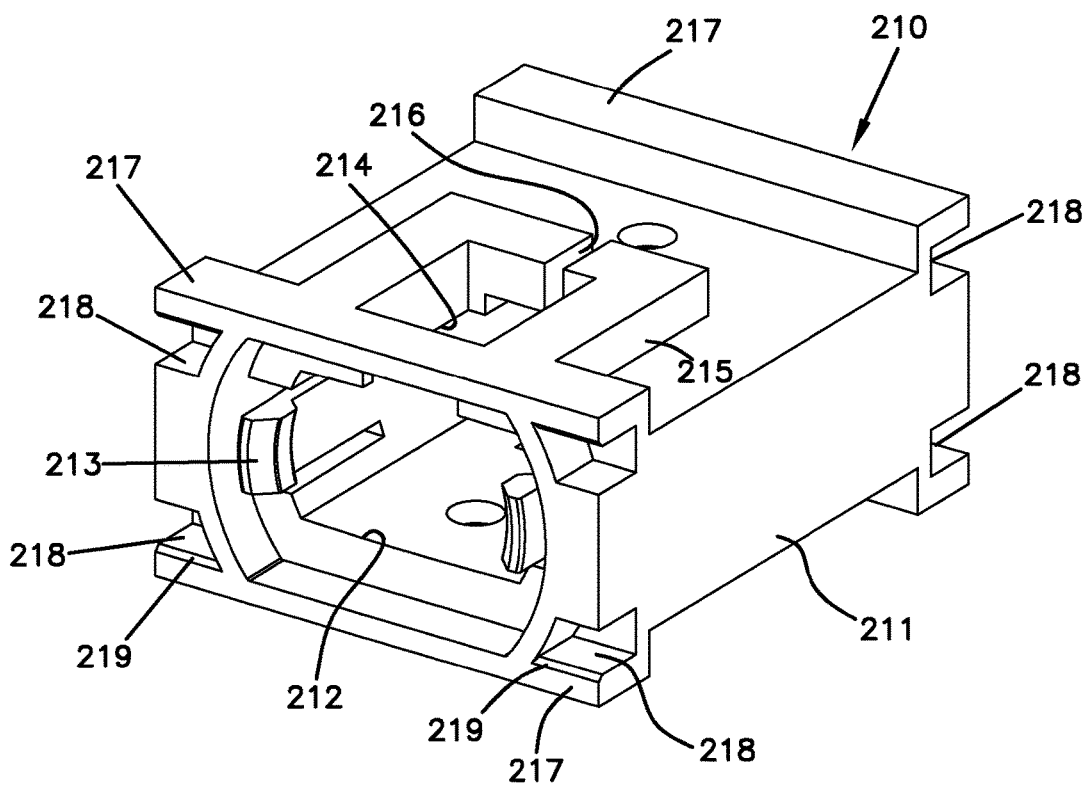
FIG. 12 is a perspective view of an example optical adapter of FIG. 11.

As shown in FIG. 12, each adapter 210 has a body 211 that is substantially the same as the adapter body 141 of FIG. 7 except for the shelf 217 instead of the ledges. Each adapter 210 defining two or more ports 212 at which plug connectors can be received. Latching arms 213 can be disposed at the ports 212 to aid in retaining the plug connectors at the ports 212. The adapter body 211 also defines at least one aperture 214 at which a contact assembly 100 can be disposed. A support wall 215 at least partially surrounds the aperture 214 and provides some protection for the contact assembly 100. In certain implementations, the support wall 215 defines a notch 216 accommodating the sensing contact 120 and the extension 117 of the first plug contact member 110.

In some implementations, the shelves 217 of the adapter body 211 are defined by recesses or cavities 218 cut into the adapter body 211 at corners around the ports 212 (FIG. 12). The shelves 217 define flat surfaces on which the circuit boards 220, 225 can be seated (see FIG. 15). The contact assemblies 100 are disposed within the apertures 214 so that first ends 101 of the contact assemblies 100 are flush with outer surfaces of the support walls 215 and second ends 103 of the contact assemblies 100 extends towards the adapter interior to be accessible through the ports 212.

Figure 11:
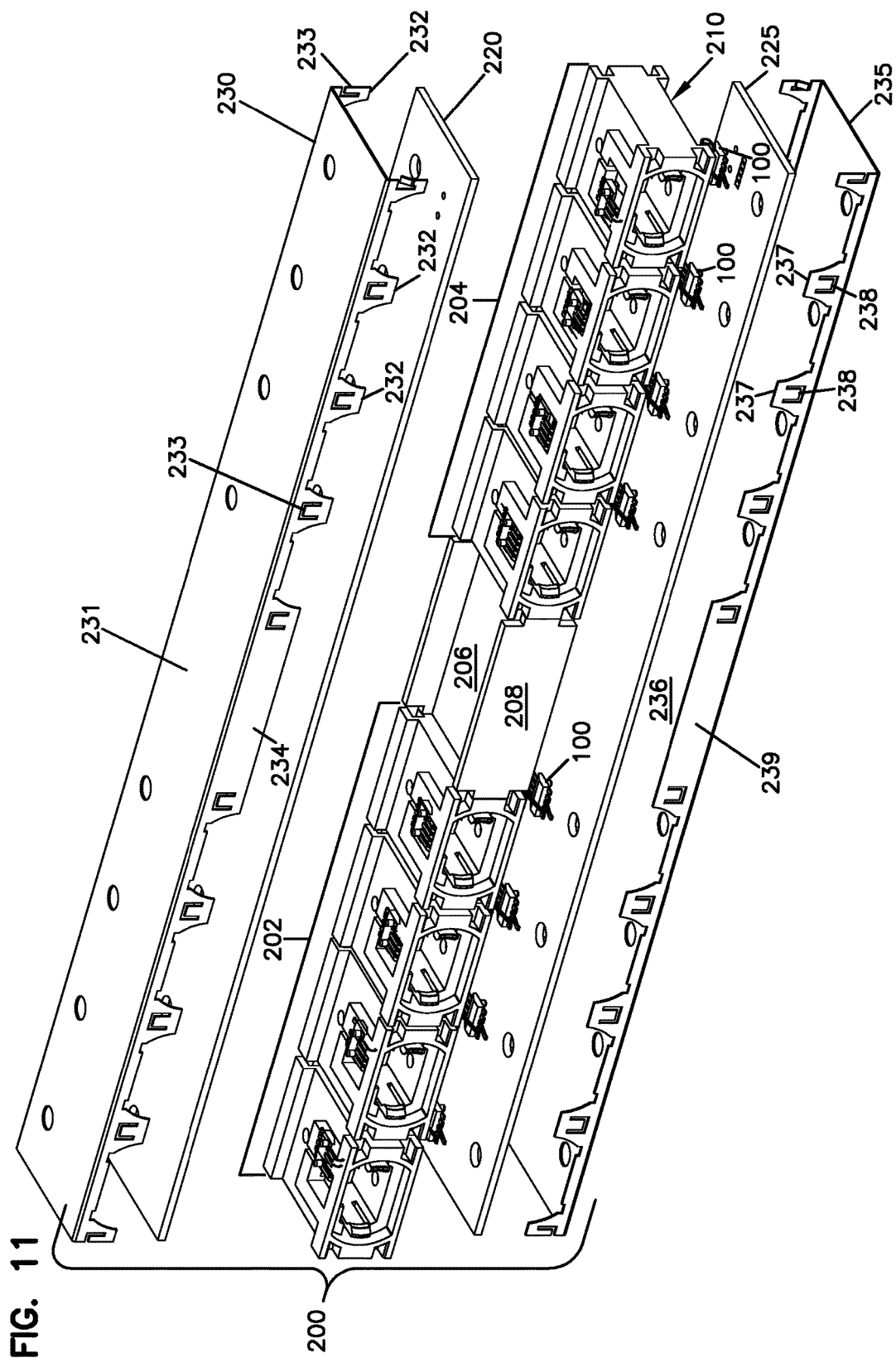
FIG. 11 is a perspective view of a second example adapter block assembly including multiple cover members and multiple circuit boards exploded outwardly from multiple optical adapters.

In some implementations, the adapters 210 can be separated into a first group 202 and a second group 204 that are separated by a gap 206 (FIG. 11). The first group 202 can be disposed at one side of the circuit board 220 and the second group 204 can be disposed at an opposite side of the circuit board 220. In the example shown, the first circuit board 220 extends across one side of the groups 202, 204 of adapters 210 and the second circuit board 225 extends across an opposite side of the groups 202, 204 of adapters 210. In certain implementations, the first and second circuit boards 220, 225 are coupled together via a board connector. One or more walls 208 or other structures can extend between the bodies 211 of the inner adapters 210 of the two groups 202, 204 to protect the board connector.

The covers 230, 235 are configured to secure to the adapters 210 to hold the boards 220, 225 to the adapters 210. In an example, the covers 230, 235 have identical constructions. The first cover 230 extends over the first board 220 at the first end 201 of the adapter block assembly 200 and the second cover 235 extends over the second board 225 at the second end 203 of the adapter block assembly 200. Each cover 230, 235 has a cover surface 231, 236 that extends over the respective board 220, 225. Flanges 232, 237 extend transversely away from the cover surfaces 231, 237 towards the adapters 210. In certain implementations, each cover 230, 235 defines elongated central flanges 234, 239 that extend over the walls 208 extending between the adapter groups 202, 204.

Each flange 232, 237 defines a flexible tab 233, 238 that is configured to deflect relative to the flange 232, 237, respectively. In some implementations, the elongated central flanges 234, 239 each define two tabs 233, 238. In an example, the tabs 233, 238 are cutout from the flanges 232, 237. The tabs 233, 238 are configured to be deflected into the cavities 218 defined in the adapter bodies 211 (see FIG. 14). In certain implementations, the cavities 218 define ramped or tapered edges 219 that facilitate insertion of the distal end of the tab 233, 238 into the respective cavity 218. In an example, the distal ends of the tabs 233, 238 cut into the material forming the adapter bodies 210 as the tabs 233, 238 are deflected into the cavities 218 to further secure the covers 230, 235 to the adapters 210.

Figure 16:
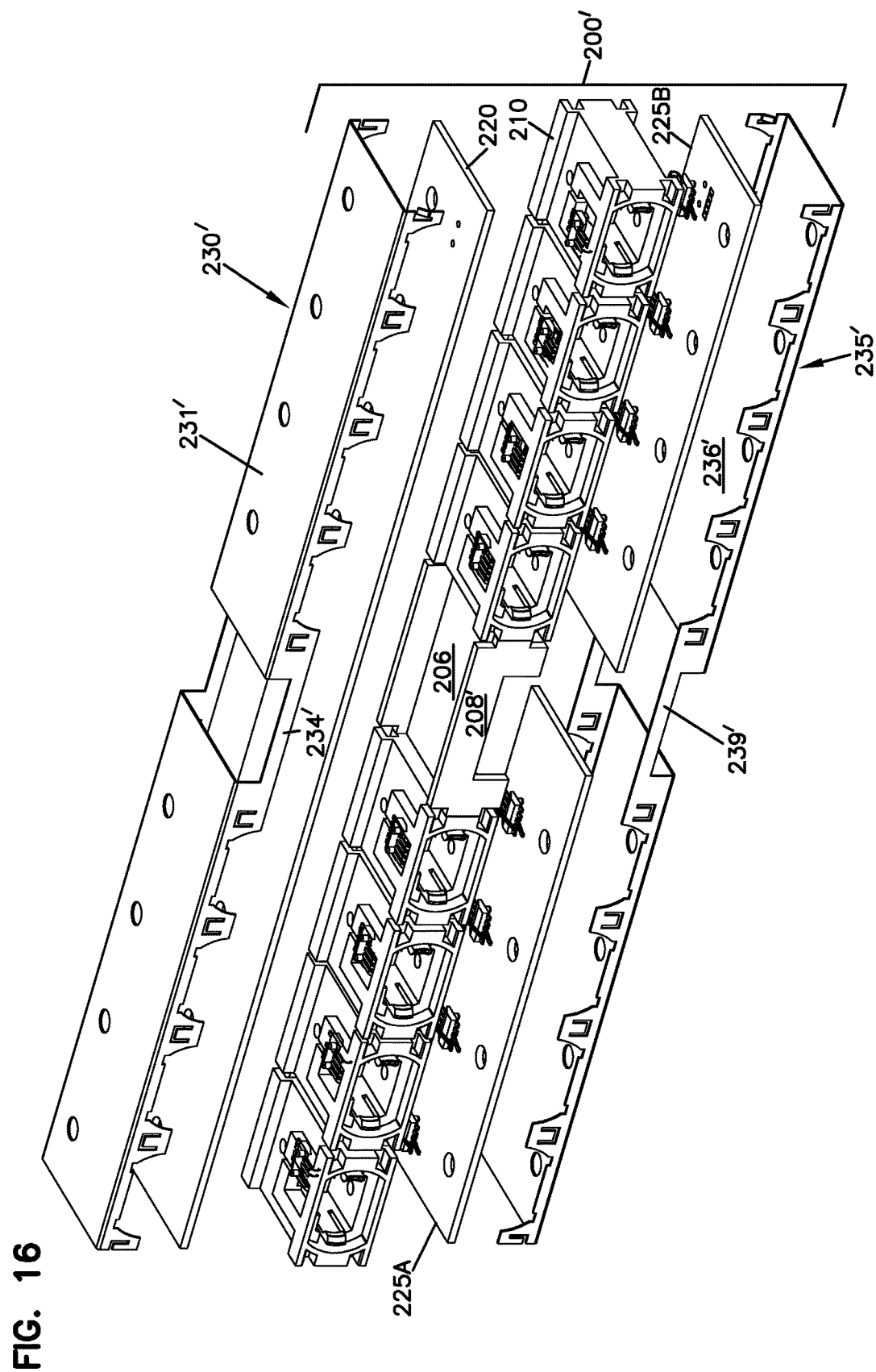
FIG. 16 is a perspective view of an alternative implementation of the adapter block assembly of FIG. 11 in which two cover members and three circuit boards are exploded outwardly from multiple optical adapters.
Figure 17:
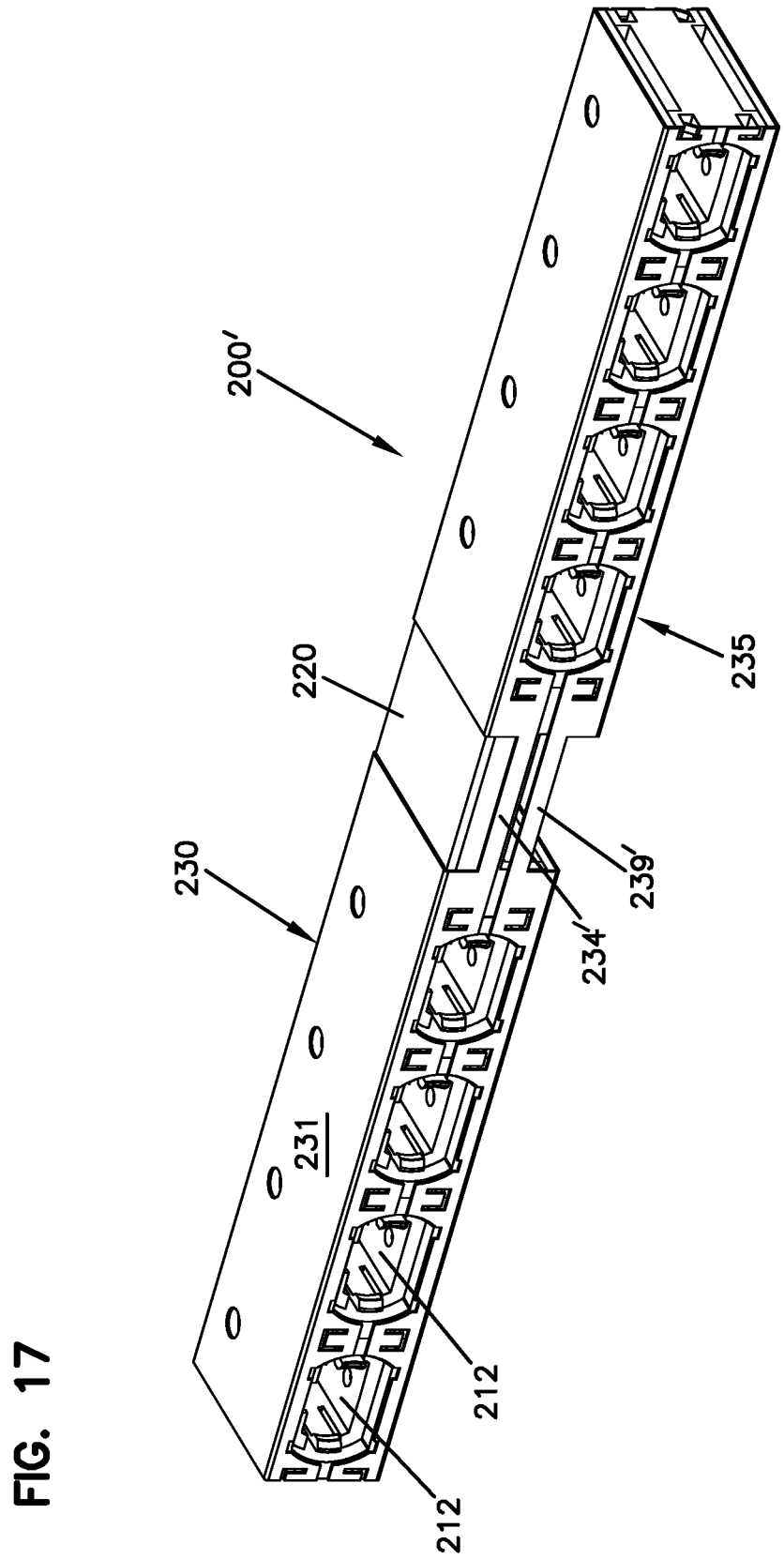
FIG. 17 is a perspective view of the adapter block assembly of FIG. 16 shown assembled.

FIGS. 16 and 17 illustrate an alternative implementation 200' of the adapter block assembly 200 of FIGS. 11-15. The adapter block assembly 200' includes the optical adapters 210 and first circuit board 220 shown in FIG. 11. However, the adapter block assembly 200' includes two separate circuit boards 225A, 225B extending across the adapters 210 opposite from the first circuit board 220. For example, one of the circuit boards 225A extends across the first group 202 of adapters 210 opposite the first circuit board 220 and the other of the circuit boards 225B extends across the second group 204 of adapters 210 opposite the first circuit board 220. The two circuit boards 225A, 225B are separated by a gap that aligns with the gap 206 between the adapters 210.

The adapter block assembly 200' also includes covers 230', 235' that hold the circuit boards 220, 225A, 225B to the adapters 210. One or more of the covers 230', 235' can define a central cutout. In the example shown in FIG. 16, the covering surface 231', 236' and elongated flanges 234', 2369' of each cover 230', 235' cooperate to define a central cutout in each cover 230', 235'. The central cutout of the second cover 235' aligns with the gap between the circuit boards 225A, 225B and the gap between the adapters 210. Accordingly, a board connector extending from the circuit board 220 can extend through the gap 206 between the adapters 210, through the gap between the circuit boards 225A, 225B, and through the central cutout of the second cover 235' to connect to circuitry disposed beneath the adapter block assembly 200' to connect the contact assemblies 100 to a data network.

Figure 23:
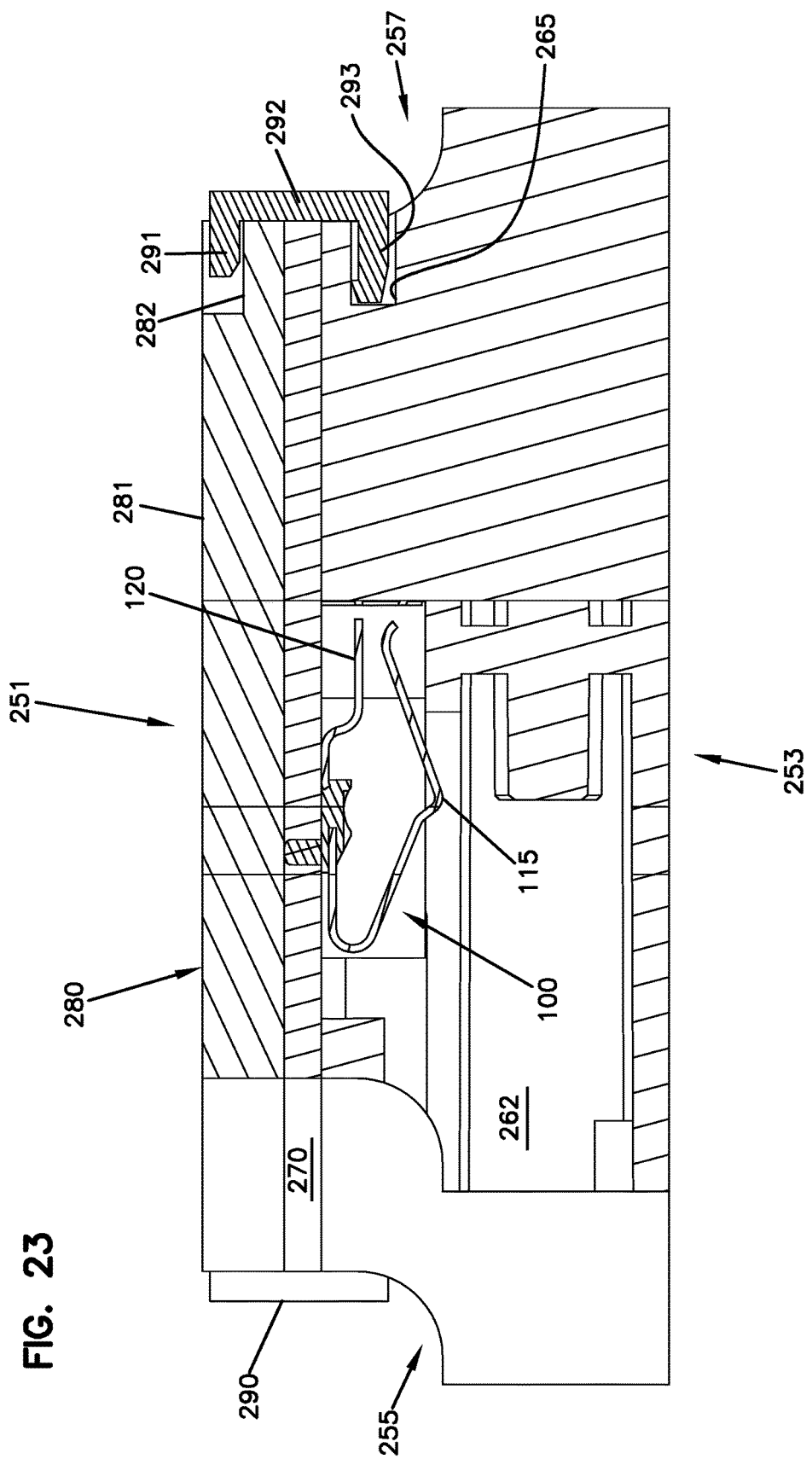
FIG. 23 is a cross-sectional view of the adapter block assembly of FIG. 20 taken along the 23-23 line of FIG. 20.

FIGS. 18-23 illustrate another example implementation of an adapter block assembly 250 having a first end 251, a second end 253, a first side 255, and a second side 257 (FIG. 23). In the example shown, the adapter block assembly 250 has a staggered configuration. Additional information about adapter blocks or other connector assemblies having staggered configurations can be found in U.S. application Ser. No. 13/737,689, filed Jan. 9, 2013, and titled "Fiber Optic Adapter Block," the disclosure of which is hereby incorporated herein by reference. In other implementations, however, the adapter block assembly 250 can have a linear configuration.

The adapter block assembly 250 includes one or more optical adapter and a circuit board 270 configured to retain contact assemblies 100 therebetween. In the example shown, the adapters are formed in adapter blocks 260. Another example retention mechanism is shown holding the circuit board 270 to the adapter blocks 260. In particular, a cover 280 is configured to secure to the adapter blocks 260 using clamp members 290. The cover 280 maintains the contact assemblies 100 in position despite deflection of the second contact sections 115 of the plug contact members 110 by insertion of a plug connector at an adapter block 260.

Figure 19:
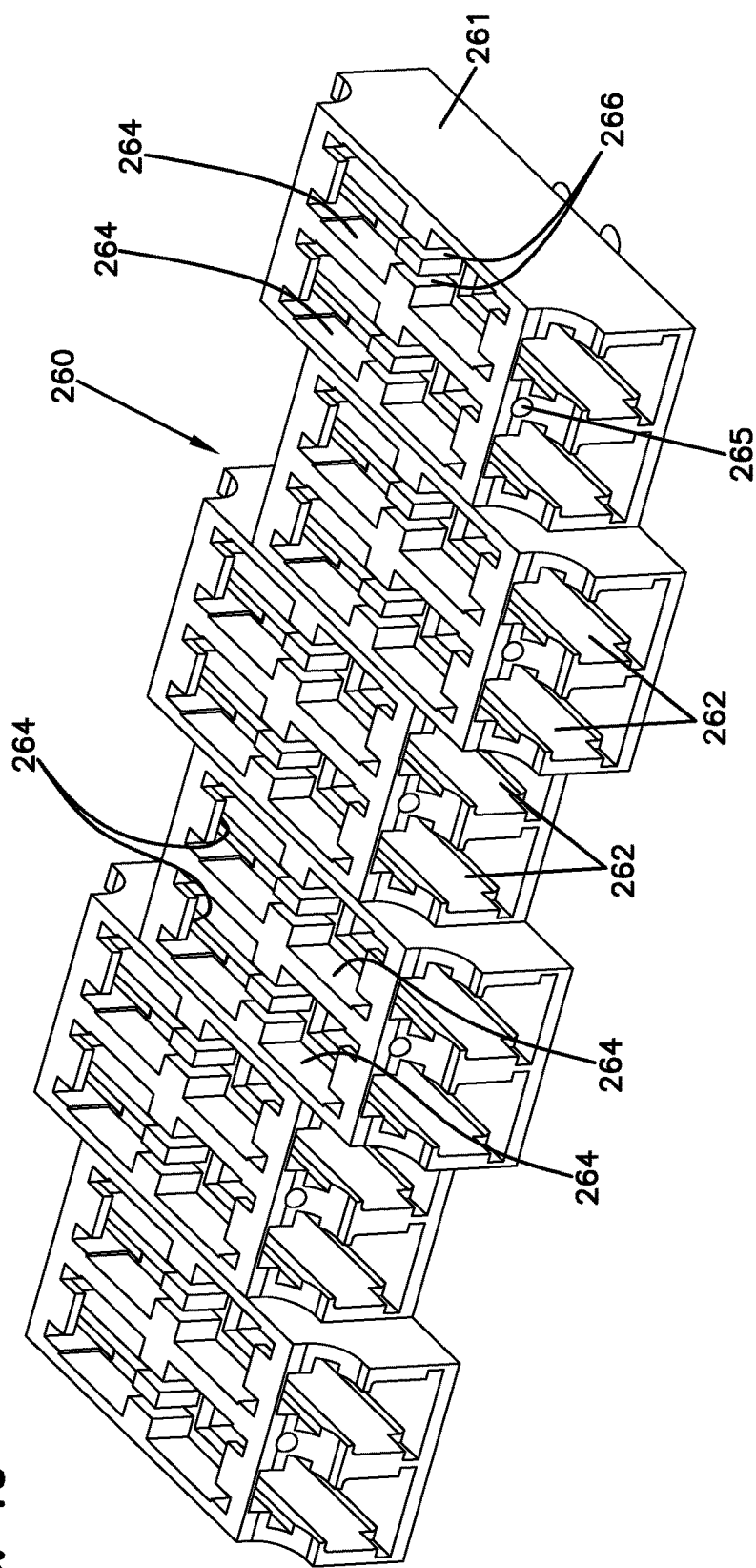
FIG. 19 is a perspective view of an example adapter block of FIG. 18.
Figure 20:
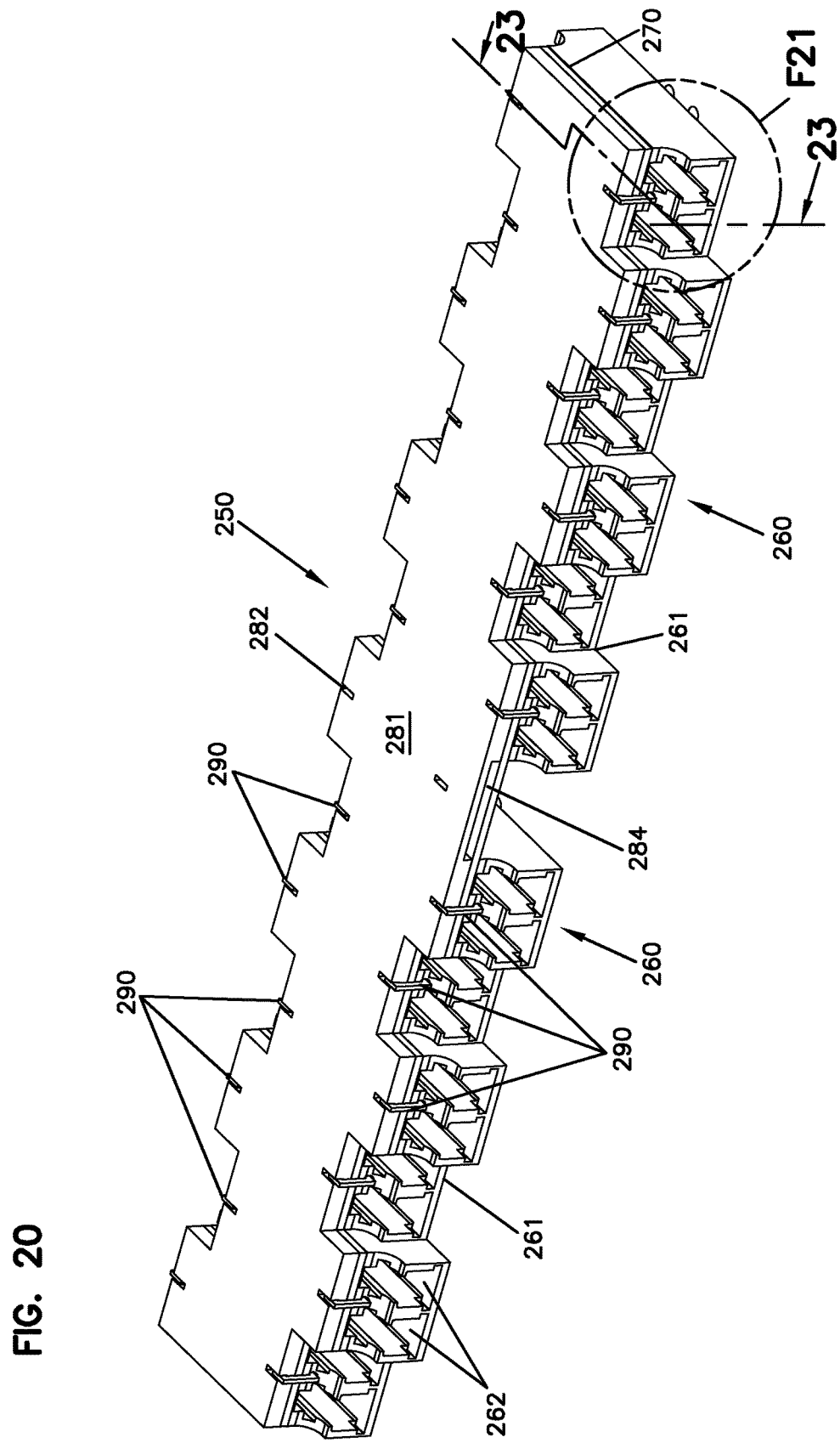
FIG. 20 is a perspective view of the first adapter block assembly of FIG. 11 shown assembled.
Figure 21:
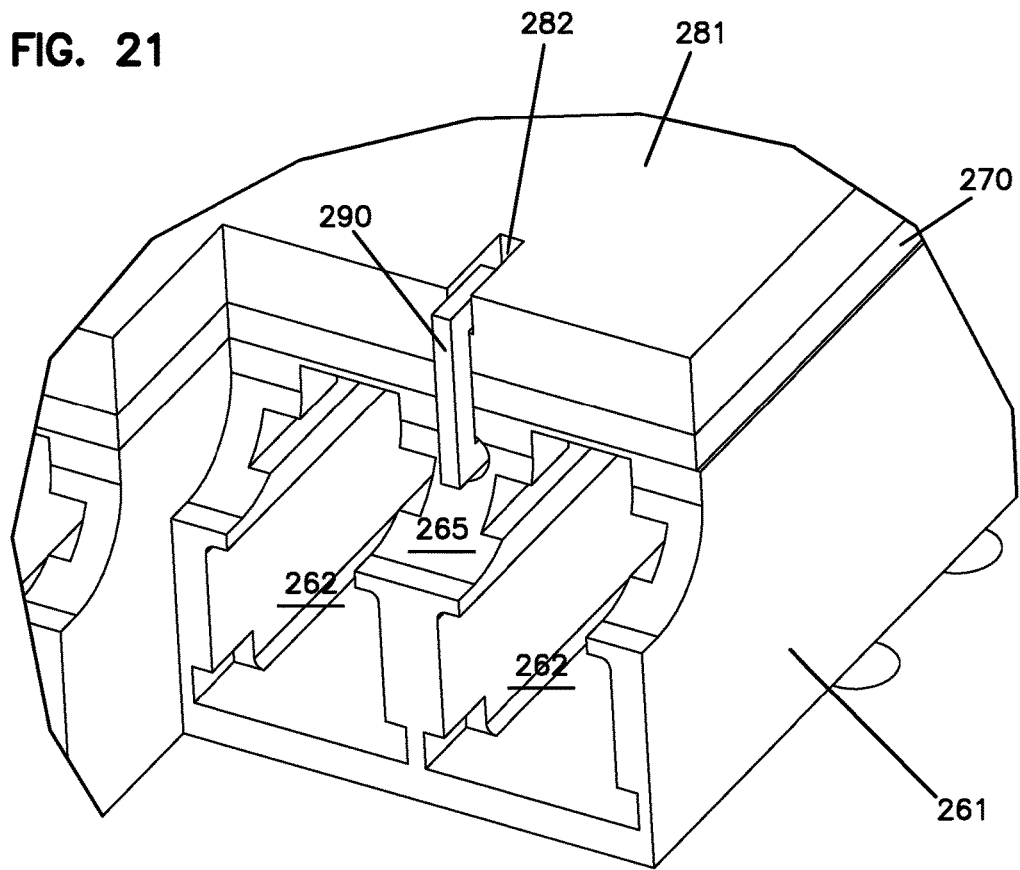
FIG. 21 is an enlarged view of a portion of FIG. 20.
Figure 22:
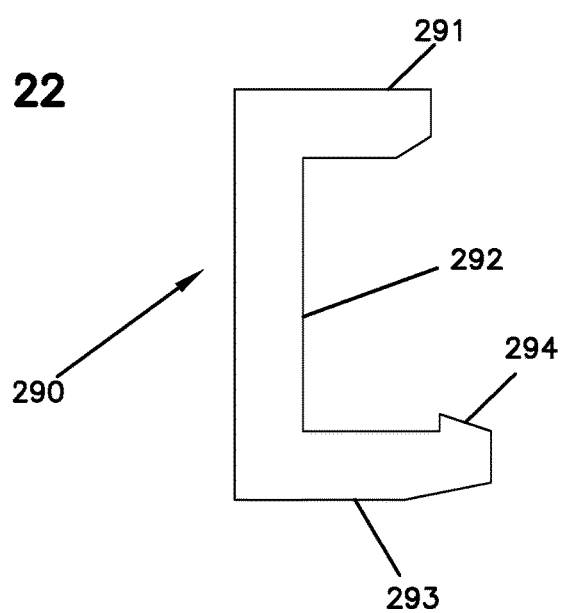
FIG. 22 is a side elevational view of an example clamp member shown in FIG. 18.

As shown in FIG. 19, each adapter block has a body 261 defining multiple pairs of ports 262. In an example, the ports 262 are configured to receive LC-type plug connectors. In such implementations, all of the contact assemblies 100 are mounted to the same surface of the adapter block body 261. In other implementations, however, the ports 262 can be configured to receive any desired type of plug connector. In certain implementations, an adapter block 260 includes between two and twenty-four pairs of ports 262. In example implementations, an adapter block 260 includes between four the sixteen pairs of ports 262. In an example, an adapter block 260 includes twelve pairs of ports 262. In an example, an adapter block 260 includes eight pairs of ports 262.

In some implementations, the ports 262 of the adapter block bodies 261 can be arranged in a straight row. In other implementations, the block bodies 261 can be formed in a staggered configuration so that the sides of the adapter block 260 facing the first and second sides 205, 207 have alternating extending portions and recessed portions. The extending portions facing the first side 205 correspond with the recessed portions facing the second side 207 and vice versa. In some implementations, each extending portion and recessed portion defines at least one port 262. Accordingly, the ports 262 of the extending portions are both axially and laterally offset relative to the ports 262 of the recessed portions. In the example shown, each extending portion and recessed portion defines two ports 262.

In some implementations, the surface of the adapter block body 261 facing the first end 251 of the adapter block assembly 250 defines an aperture 264 corresponding to each port 262. In the example shown in FIG. 18, each staggered section of the adapter block 261 defines four apertures 264. The aperture 264 of each port 262 includes an extension 266 extending towards the aperture 264 of the corresponding port 262. The extension 266 accommodates the sensing contact 120 and extension 117 of the first plug contact member 110 of each contact assembly 100. In some implementations, the adapter block assembly 250 includes only one adapter block 260. In other implementations, however, the adapter block assembly 250 can include multiple adapter blocks 260.

Figure 18:
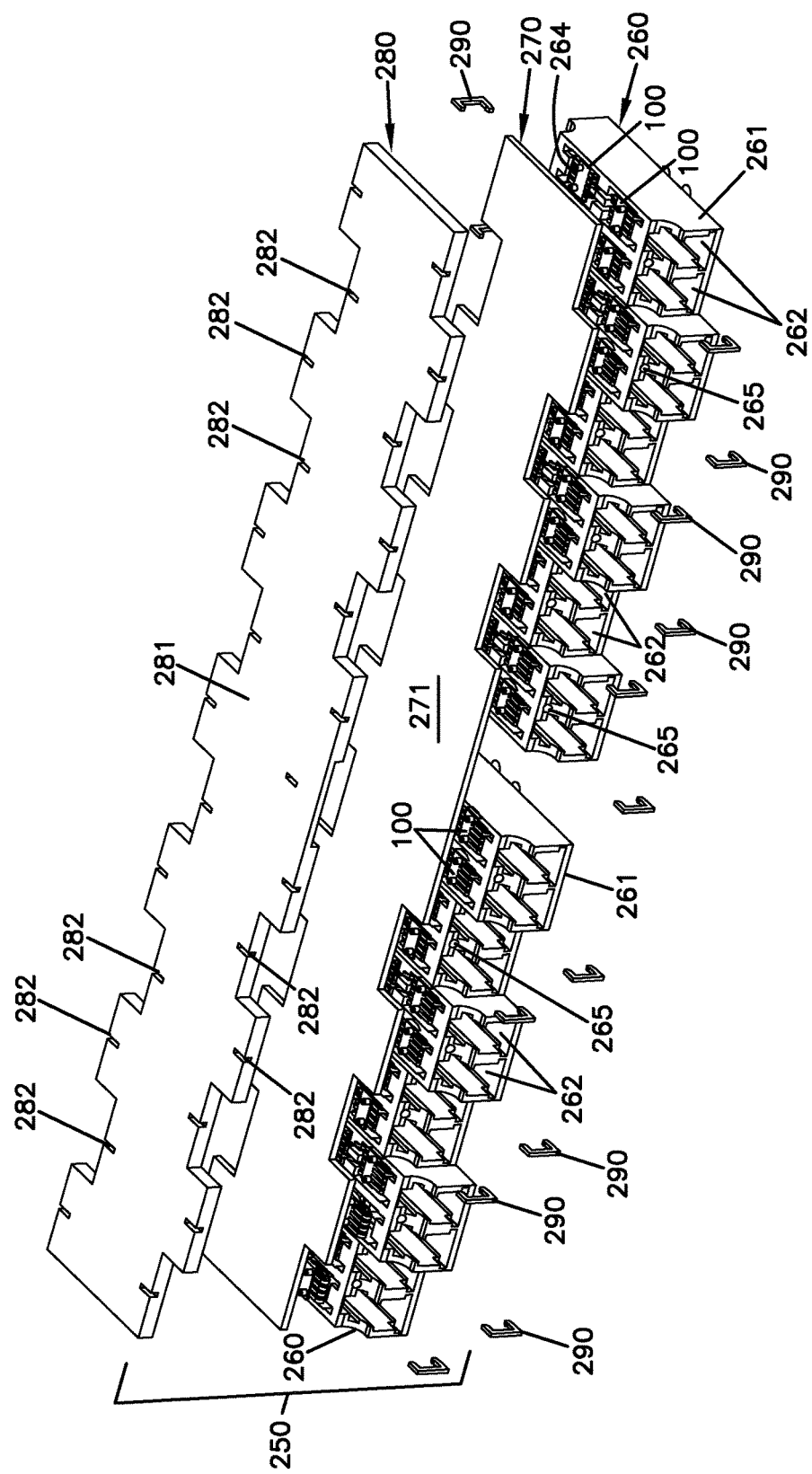
FIG. 18 is a perspective view of a third example adapter block assembly including a cover member, a circuit board, and multiple clamp members exploded outwardly from adapter blocks.

In the example shown in FIG. 18, the adapter block assembly 150 includes a first adapter block 160 laterally spaced from a second adapter block 160. In some such implementations, a single circuit board 270 extends across both adapter blocks 260 and across the space therebetween. In certain implementations, the circuit board 270 has a staggered configuration that generally matches the staggered configuration of the adapter blocks 260. Accordingly, a periphery of the circuit board 270 aligns with a periphery of the adapter blocks 260. In other implementations, each adapter block 260 may have a respective circuit board 270.

The one or more circuit boards 270 can be sandwiched between the adapter blocks 260 and the cover 280. The cover 280 includes a covering surface 281 that extends over the circuit board 270. In some implementations, the covering surface 281 also has a staggered configuration that generally matches the staggered configurations of the circuit board 270 and adapter blocks 260. Accordingly, a periphery of the cover 280 aligns with a periphery of the adapter blocks 260. The covering surface 281 defines slots 282 extending inwardly from the periphery of the covering surface 281. The slots 282 align with apertures or recesses 265 defined in the adapter blocks 260. In the example shown, the recesses 265 are defined between ports 262.

Clamp members 290 each include a first section 291 that is configured to extend into one of the slots 282 of the cover 280, a second section 292 that is configured to extend across an edge of the circuit board 270, and a third section 293 that is configured to extend into one of the apertures 265 of one of the adapter blocks 260 to hold the cover 280 to the adapter block 260. In certain implementations, the clamp members 290 are C-shaped. In certain implementations, the clamp members 290 are U-shaped. In certain implementations, the third section 293 of a clamp member 290 includes a barb 294 that facilitates engagement between the clamp member 290 and the adapter body 261.

In certain implementations, the cover 280 defines a recessed section that cooperates with the circuit board 270 to define a cavity 284. Various components can be mounted to the circuit board 270 and accommodated by the cavity 280. For example, one or more light indicators can be mounted to the circuit board 270. Light emitted by these indicators may be visible through the cavity 284.

In accordance with some aspects of the disclosure, some of the adapter block assemblies disclosed above have heights of no more than 13 mm including the adapters, the contact assemblies, the circuit board assemblies, and any cover assembly or housing assembly. For example, some of the adapter block assemblies have heights of no more than 12.75 mm. Certain of the adapter block assemblies have heights of no more than 12.5 mm. In an example, certain of the adapter block assemblies have heights of no more than 12.55 mm. In certain implementations, the adapter assemblies by themselves can have heights of no more than 9.5 mm. In an example, certain of the adapter block assemblies by themselves can have heights of no more than 9.35 mm. In certain implementations, the adapter assemblies by themselves can have heights of no more than 9 mm. In certain implementations, the adapter assemblies by themselves can have heights of no more than 8.5 mm. In certain implementations, the adapter assemblies by themselves can have heights of no more than 8 mm.

Figure 25:
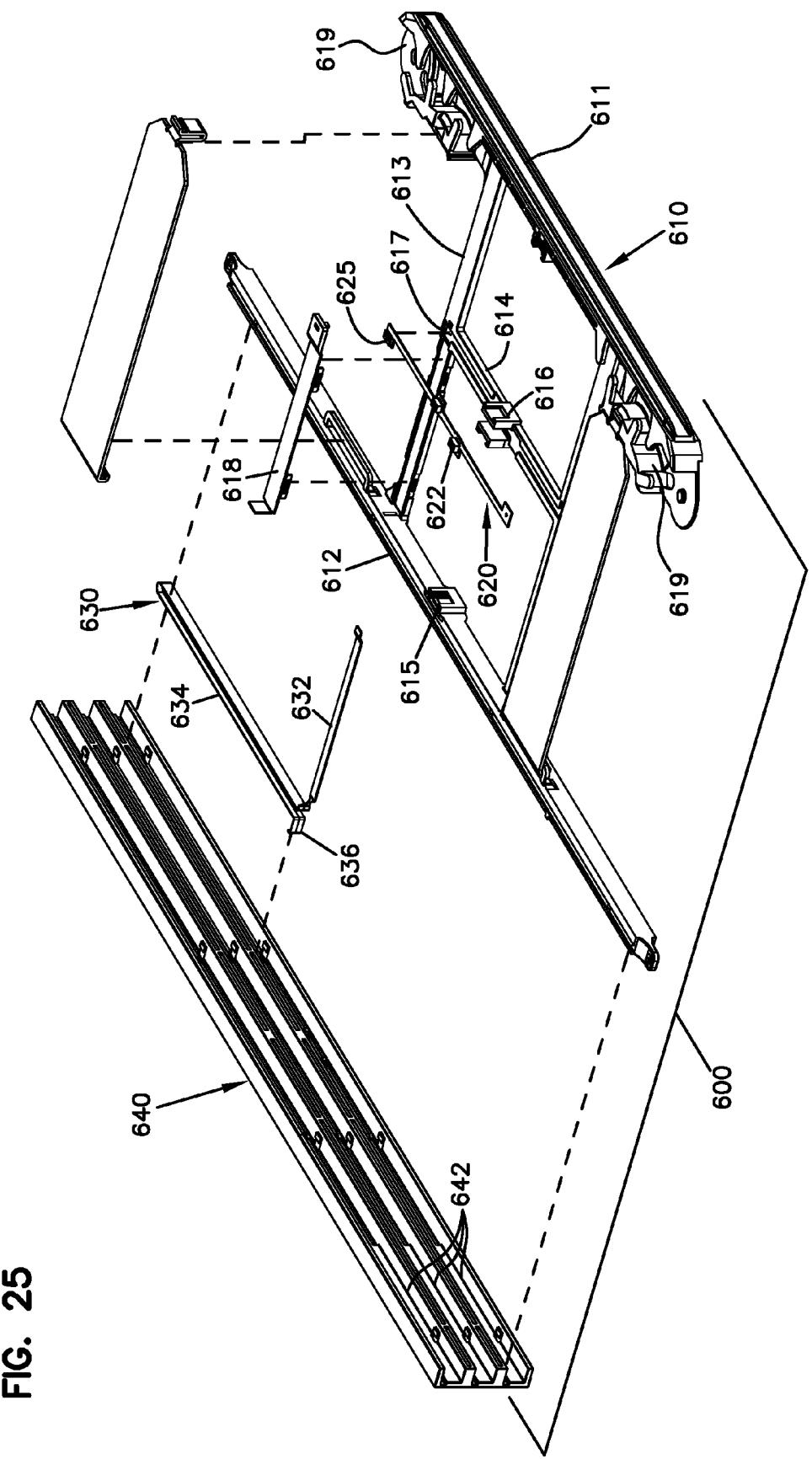
FIG. 25 illustrates an example tray arrangement including another example tray to which any of the adapter block assemblies disclosed herein can be mounted.

FIG. 25 illustrates an example tray arrangement 600 including another example tray 610 to which any of the adapter block assemblies disclosed herein can be mounted. A circuit board arrangement 620 is configured to mount to the tray 610. The circuit board arrangement 620 is configured to communicate with components (e.g., a controller) of the circuit board arrangement of the adapter block assembly mounted to the tray 610. The tray 610 is configured to be slideably mounted to a side plane 640. A flexible cable 630 or other electrical circuit connects the circuit board arrangement 620 of the tray 610 to an electrical circuit or local processor located at or connected to the side plane 640. The tray 610 also can be configured to manage optical fibers routed to the ports of the adapter block assembly mounted to the tray 610.

In the example shown in FIG. 25, the tray 610 includes cross-members 613 extending between two side rails 611, 612. A mounting rail 614 extends between the cross-members 613. In some implementations, mounting members 616 extend upwardly from the mounting rail 614. The mounting members 616 are configured to engage an adapter block assembly to further secure the adapter block assembly to the tray 610. Mounting structures 615 also are provided at the inner sides of the side rails 611, 612. In certain implementations, the mounting structures 615 are laterally aligned with each other and with the mounting members 616.

The mounting rail 614 defines a pocket 617 at which the circuit board 620 can be mounted. Connection members 622 are mounted to the circuit board 620 in alignment with circuit board contact members of the adapter block assembly to be mounted to the tray 610. The circuit board 620 also includes a connection member 625 at a cross-member 613. In certain implementations, at least part of the cross-member 613 can also define part of the pocket 617. At least a portion 632 of the flexible cable 630 can be routed through the second side rail 612, through the pocket 617 along the cross-member 613, to the connection member 625 of the circuit board 620. A cover 618 can be mounted to the cross-member 613 to cover (e.g., protect) the flexible cable portion 632.

An opposite end 636 of the flexible cable is routed to or through the side plane 640. The side plane 640 defines one or more guide slots 642 along which the tray 610 can slide. For example, one of the side rails 611, 612 of the tray 610 can slide along one of the guide slots 642. The flexible cable 630 includes an intermediate length 634 that extends between the side rail 612 of the tray 610 and the side plane 640. The intermediate length 634 is folded back on itself to accommodate movement of the tray 610 relative to the side plane 640.

Further information about how the tray 610 can be moveably mounted to the side plane 640 and how such an arrangement can be used within a telecommunications system can be found in copending U.S. Provisional Application No. 61/761,009, filed Feb. 5, 2013, and titled "Slidable Telecommunications Tray with Cable Slack Management;" and in copending U.S. Provisional Application No. 61/843,744, filed Jul. 8, 2013, and titled "Slidable Telecommunications Tray with Cable Slack Management," the disclosure of which is hereby incorporated herein by reference.

Figure 26:
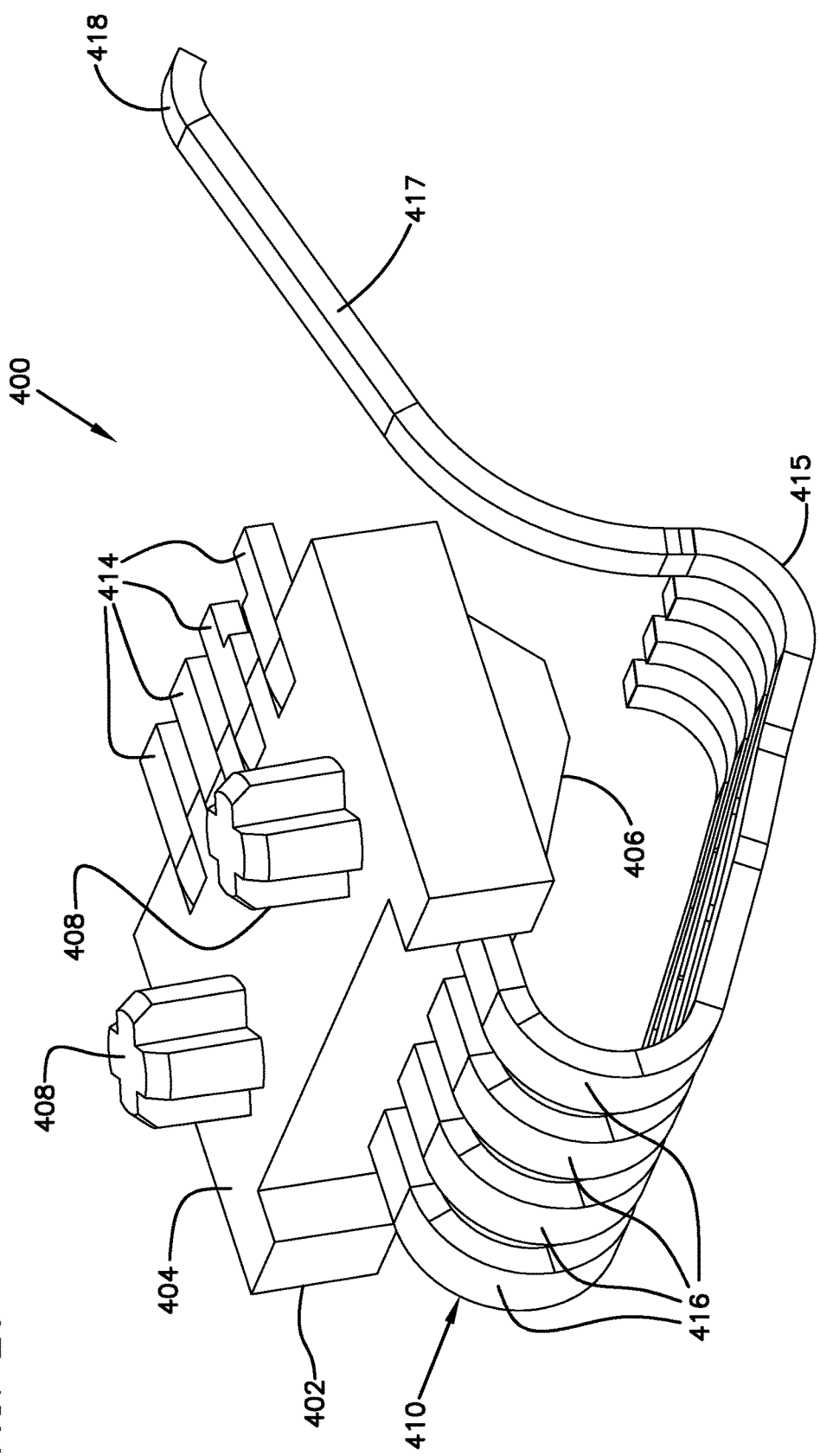
FIG. 26 is a perspective view of another example contact assembly including plug contact members overmolded together.

FIGS. 26-28 illustrate another example contact assembly 400 suitable for implementing any of the media reading interfaces 316, 318 of FIG. 24. The contact assembly 400 has a first end 401, a second end 403, a first side 405, and a second side 407 (see FIG. 28). The contact assembly 400 includes one or more plug contact members 410; and a body 402 that retains the plug contact members 410 (FIG. 26). Each of the plug contact members 410 is laterally spaced from each other. The plug contact members 410 extend from the body 402 towards the first and second sides 405, 407 of the contact assembly 400.

Each plug contact member 410 includes a body extending from a first end to a second end. Each plug contact member 410 defines a first contact section 414 at the first end of the body and a second contact section 415 that is located closer to the second end of the body than the first contact section 414. The first and second contact sections 414, 415 of some of the plug contact members 410 can align along a non-lateral direction. For example, the contact sections 414, 415 of some of the plug contact members 410 can align along a first direction extending between the first and second ends 401, 403 of the contact assembly 400.

A resilient section 416 is disposed between the first and second contact sections 414, 415 of each plug contact member body to enable movement of the second contact section 415 relative to the first contact section 414. For example, the resilient section 416 may enable movement of at least one of the contact sections 414, 415 along the first direction. At least a first of the plug contact members 410 also defines a third contact section 418. In the example shown, the third contact section 418 is defined at a distal end of an extension 417 that extends from the second contact section 415 of the first plug contact member 410. The extension 417 includes another resilient section (e.g., a contoured section) coupled to the second contact section 415.

In some implementations, the first contact sections 414 of the plug contact members 410 extend parallel to each other. In certain implementations, the second contact sections 415 of the plug contact members 410 are located closer together than the first contact sections 414. In certain implementations, a width of the contact assembly taken at the first contact sections 414 is larger than a width of the contact assembly taken at the second contact sections 415. For example, the outer plug contact members 410 of the contact assembly 400 can contour inwardly towards the inner contact members 410. The inner contact members also may contour towards each other. In certain implementations, the width of each plug contact member 410 also can taper inwardly as the contact member 410 extends towards the second contact section 415.

The body 402 holds the contact members 410 in the laterally spaced configuration shown in FIG. 26. In an example, the body 402 is formed by overmolding the plug contact members 410 in the laterally spaced configuration. The body 402 defines a first surface 404 facing towards the first end 401 of the contact assembly 400. In an example, the first surface 404 is generally planar. In certain implementations, a ramped surface 406 faces towards the first side 405 and second end 403 of the contact assembly 400. The ramped surface 406 accommodates movement of the plug contact members 410 when the second contact surfaces 415 move towards the first contact surfaces 414. In certain implementations, the body 402 also includes one or more securement structures to aid in mounting the contact assembly 400 to a printed circuit board or other structure. In the example shown in FIG. 26, the securement structures include two pegs 408 that extend towards the first end 401 of the contact assembly 400.

Figure 29:
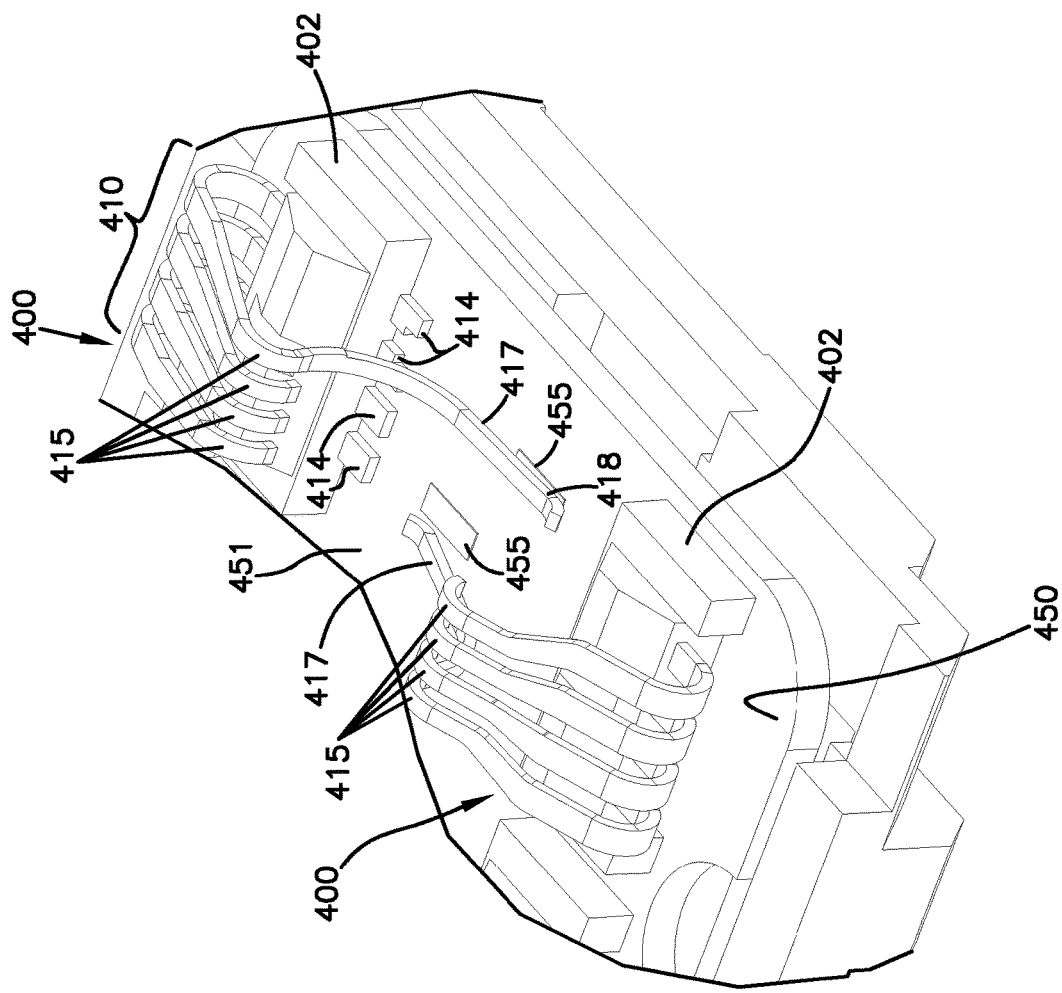
FIG. 29 is a perspective view of a portion of a circuit board to which two contact assemblies are mounted.

As shown in FIG. 29, the contact assembly 400 can be mounted to a printed circuit board 450 or other structure. The first surface 404 of the contact assembly body 402 lies on a first surface 451 of the board 450. The pegs 408 aid in aligning the contact assembly 400 on the board 450 (e.g., via alignment holes defined in the board 450). In certain implementations, the printed circuit board 450 includes contact pads that align with and touch the first contact sections 414 of the plug contact members 410. The second contact sections 415 of the plug contact members 410 extend upwardly from the board 450 to mate with corresponding contacts of a plug connector or other connector arrangement to be electrically coupled to the board 450.

When a plug connector having corresponding contacts mates with the contact assembly 400, the plug connector contacts are brought into electrical contact with the second contact sections 415 of the plug contact members 410. Accordingly, electrical signals can be passed from the plug connector contacts to the contacts pads of the circuit board 450 via the plug contact members 410. For example, the plug contact members 410 can provide a power line, a grounding line, and a data line between the plug connector contacts and the board 450.

The third contact section 418 of the first plug contact member 410 aligns with a contact pad 455 on the circuit board 450 along a non-lateral direction. For example, movement of the extension 417 of the first plug contact member 410 along the non-lateral direction may bring the third contact section 418 of the first plug contact member 410 into physical contact (e.g., via a wiping movement) with the contact pad 455. When the third contact section 418 wipes across the contact pad 455, the first plug contact member 410 completes a circuit. In certain implementations, the plug connector contacts or the plug connector body can press upon the second contact sections 415 to deflect portions of the plug contact members 410. For example, one of the plug connector contacts can cause deflection of the extension 417 of the first plug contact member 410 towards the circuit board contact pad 455. When the third contact section 418 touches the pad 455, the third contact section 418 shorts with the contact pad on which the first contact surface 414 of the first plug contact member 410 seats. A processor coupled to the board 450 (either directly or remotely) can interpret the shorting of the contact pads as indicating the presence of a plug connector.

In general, the contact assembly 400 is configured to be mounted to an adapter block assembly that connects the contact assembly 400 to a data network. In certain implementations, the adapter block assembly has PLI functionality as well as PLM functionality. The contact assembly 400 transfers data and/or power between the optical adapter and the network. The contact assembly 400 also can determine when a plug connector is present at the optical adapter as noted above. The contact assembly 400 also is configured to mate with a contact arrangement disposed on or in a plug connector to be received at a port of the optical adapter. Information can be transferred between the plug connector and the data network via the contact arrangement, the contact assembly 400, and the adapter block assembly.

In some implementations, the contact assembly 400 can be disposed in an aperture defined in the optical adapter. The first contact sections 414 of the contact members 410 couple to a circuit board 450 that mounts to the adapter and the second contact sections 415 of the plug contact members 410 extend towards the adapter port for connection with a plug connector. Some types of optical adapters include a single contact assembly 400. Other types of optical adapters include two contact assemblies 400. For example, certain types of optical adapters may include two contact assemblies 400 for opposing ports. Still other types of adapters include more than two contact assemblies 400 (e.g., adapters having more than two ports).

In some implementations, the contact assemblies 400 can be mounted to a common side of the optical adapter. For example, LC-type optical adapters may have multiple contact assemblies 400 mounted to one side of the adapter. In other implementations, the contact assemblies 400 can be mounted to opposite sides of the optical adapter. For example, MPO-type optical adapters may have a first contact assembly 400 mounted to a top of the optical adapter and a second contact assembly 400 mounted to a bottom of the optical adapter. In such cases, the first contact assembly 400 is associated with a first port of the MPO-type adapter and the second contact assembly 400 is associated with a second port of the MPO-type adapter.

The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. An adapter block assembly comprising:
   a first optical adapter defining oppositely facing first and second ports that provide access to an interior of the first optical adapter, the first optical adapter also defining an aperture that provides access to the interior, the aperture being defined in a surface extending between the first and second ports;
   a first contact assembly disposed in the aperture defined in the first optical adapter;
   at least a first printed circuit board disposed adjacent one side of the first optical adapter so that the first printed circuit board covers the aperture and the first contact assembly; and
   a retainer arrangement that holds the first printed circuit board to the first optical adapter with sufficient force to retain the first contact assembly within the aperture;
   wherein a total height of the adapter block assembly is no more than 13 mm.

2. The adapter assembly of claim 1, wherein the retainer arrangement comprises:
   a cover that extends over the first printed circuit board; and
   a plurality of retention members that secure the cover to the first optical adapter.

3. The adapter block assembly of claim 2, wherein the retention members include flanges that extend outwardly from the cover, the flanges having deflectable tabs that are sized to deflect into undercuts defined in the first optical adapter.

4. The adapter block assembly of claim 2, wherein the retention members include separate clamp members having first sections that couple to the cover, second sections that extend over edges of the cover and the first printed circuit board, and third sections that couple to the first optical adapter.

5. The adapter block assembly of claim 1, wherein the retainer arrangement includes a retention strip having an adapter retention barb configured to attach to the first optical adapter and a board retention barb configured to attach to the first printed circuit board.

* * * * *